US010515625B1

(12) United States Patent
Metallinou et al.

(10) Patent No.: US 10,515,625 B1
(45) Date of Patent: Dec. 24, 2019

(54) MULTI-MODAL NATURAL LANGUAGE PROCESSING

(71) Applicant: Amazon Technologies, Inc., Seattle, WA (US)

(72) Inventors: Angeliki Metallinou, Mountain View, CA (US); Rahul Goel, Mountain View, CA (US); Vishal Ishwar, Tempe, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/828,174

(22) Filed: Nov. 30, 2017

Related U.S. Application Data

(60) Provisional application No. 62/553,066, filed on Aug. 31, 2017.

(51) Int. Cl.
| | | |
|---|---|---|
| *G10L 15/16* | (2006.01) |
| *G10L 15/14* | (2006.01) |
| *G10L 15/197* | (2013.01) |
| *G06F 3/16* | (2006.01) |
| *G10L 15/26* | (2006.01) |
| *G10L 15/02* | (2006.01) |

(52) U.S. Cl.
CPC .............. *G10L 15/16* (2013.01); *G06F 3/167* (2013.01); *G10L 15/02* (2013.01); *G10L 15/144* (2013.01); *G10L 15/197* (2013.01); *G10L 15/265* (2013.01); *G10L 2015/025* (2013.01)

(58) Field of Classification Search
CPC ......... G10L 15/06; G10L 15/16; G10L 15/18; G10L 15/1815; G10L 15/1822; G10L 15/183; G10L 15/22; G10L 2015/228; G10L 15/265
USPC .................. 704/10, 232, 243, 257, 270, 275
See application file for complete search history.

(56) References Cited

U.S. PATENT DOCUMENTS

| | | |
|---|---|---|
| 7,925,507 B2 | 4/2011 | Weng et al. |
| 8,447,607 B2 | 5/2013 | Weider et al. |
| 8,473,299 B2 | 6/2013 | Di Fabbrizio et al. |
| 8,566,102 B1 | 10/2013 | Bangalore et al. |
| 9,070,366 B1 | 6/2015 | Mathias et al. |
| 9,436,678 B2 | 9/2016 | Mathias et al. |
| 9,754,589 B2 | 9/2017 | Mathias et al. |
| 9,911,413 B1* | 3/2018 | Kumar ................ G10L 15/1815 |
| 10,032,451 B1* | 7/2018 | Mamkina ................ G10L 15/22 |
| 10,170,107 B1* | 1/2019 | Dreyer .................... G10L 15/26 |
| 2005/0182628 A1 | 8/2005 | Choi |
| 2006/0080107 A1 | 4/2006 | Hill et al. |
| 2007/0033005 A1 | 2/2007 | Cristo et al. |
| 2012/0254810 A1* | 10/2012 | Heck ........................ G10L 15/22 715/863 |

(Continued)

*Primary Examiner* — Martin Lerner
(74) *Attorney, Agent, or Firm* — Knobbe, Martens, Olson & Bear, LLP

(57) ABSTRACT

Multi-modal natural language processing systems are provided. Some systems are context-aware systems that use multi-modal data to improve the accuracy of natural language understanding as it is applied to spoken language input. Machine learning architectures are provided that jointly model spoken language input ("utterances") and information displayed on a visual display ("on-screen information"). Such machine learning architectures can improve upon, and solve problems inherent in, existing spoken language understanding systems that operate in multi-modal contexts.

20 Claims, 8 Drawing Sheets

(56) References Cited

U.S. PATENT DOCUMENTS

| | | | |
|---|---|---|---|
| 2013/0124205 A1* | 5/2013 | Genly | G10L 15/04 704/254 |
| 2014/0079195 A1* | 3/2014 | Srivastava | G10L 15/26 379/88.01 |
| 2014/0163959 A1* | 6/2014 | Hebert | G06F 17/2785 704/9 |
| 2015/0288818 A1* | 10/2015 | Srivastava | G10L 15/26 379/88.01 |
| 2016/0259779 A1* | 9/2016 | Labsk | G10L 15/18 |
| 2017/0316775 A1* | 11/2017 | Le | G10L 15/18 |
| 2018/0137855 A1* | 5/2018 | Lee | G10L 15/16 |
| 2018/0157638 A1* | 6/2018 | Li | G10L 15/22 |
| 2018/0211669 A1* | 7/2018 | Corcoran | G10L 15/32 |
| 2018/0233141 A1* | 8/2018 | Solomon | G10L 15/22 |
| 2018/0233143 A1* | 8/2018 | Papangelis | G10L 15/16 |
| 2018/0336183 A1* | 11/2018 | Lee | G06F 17/2785 |
| 2019/0034795 A1* | 1/2019 | Zitouni | G10L 15/063 |

* cited by examiner

MULTI-MODAL NATURAL LANGUAGE PROCESSING

CROSS-REFERENCE TO RELATED APPLICATION

The present application claims priority to U.S. Provisional Patent Application No. 62/553,066, filed on Aug. 31, 2017, which is incorporated by reference herein.

BACKGROUND

Electronic devices, such as voice-enabled electronic devices, are capable of performing various functions. For instance, an individual may speak a command to activate such a device and in response, the device may perform various functions and/or cause one or more actions to be performed. Some voice-enabled electronic devices may also include speakers, display screens, and the like for presentation of content.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
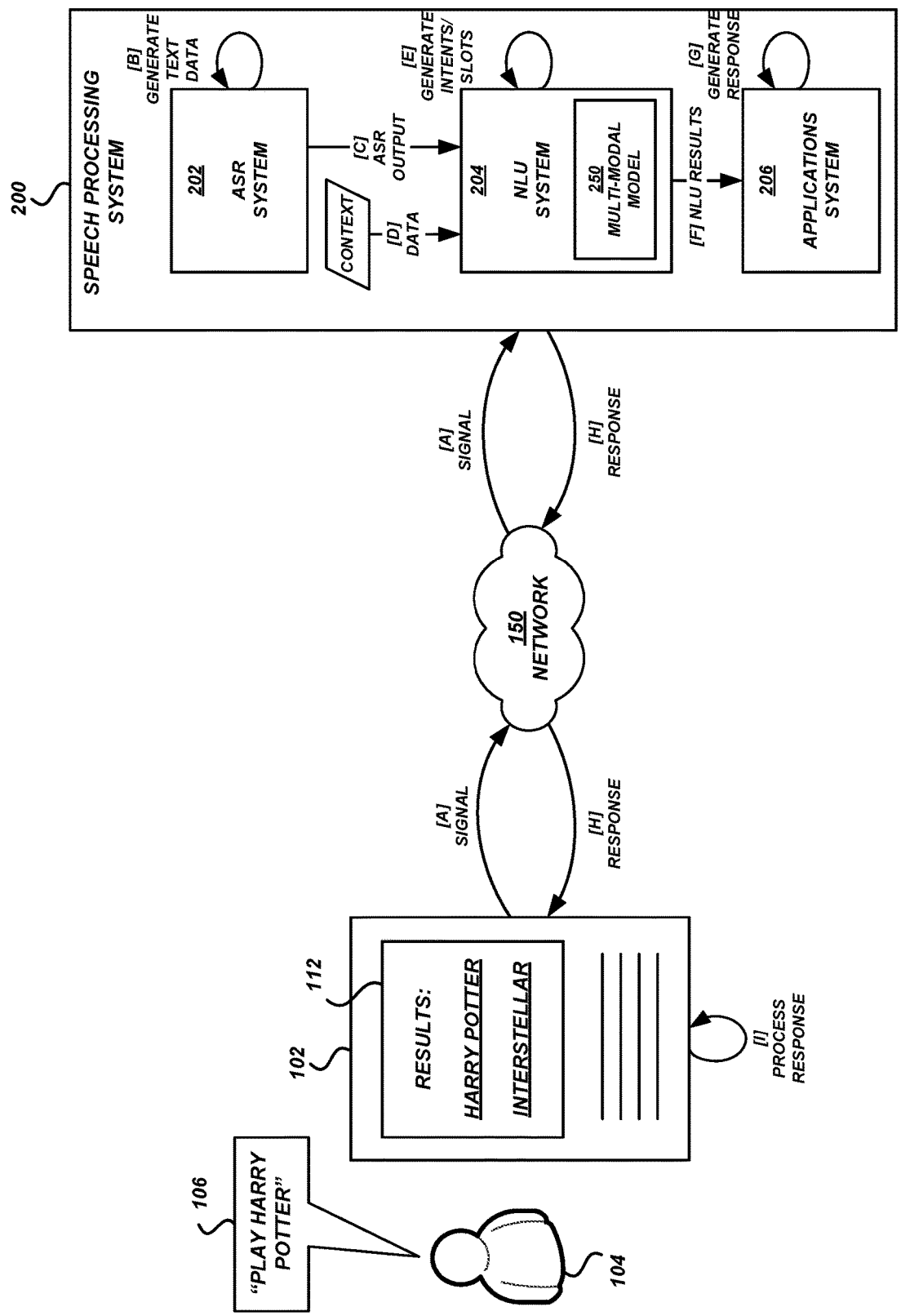
FIG. 1 is a block diagram showing data flows an interactions between systems and components of an illustrative networked speech processing environment according to some embodiments.

The present disclosure is directed to a system that uses data regarding events in different modalities to process spoken commands and other utterances. In some embodiments, the system can use audio data representing an utterance, and also data regarding content visually presented on a display screen of a computing device when the utterance was made. By incorporating data regarding displayed content into the processing of spoken utterances, the system can more accurately determine the meaning of—and more accurately respond to—utterances that reference or relate in some way to the displayed content.

A spoken language processing system may process utterances by generating text data representing transcripts or other textual representations of the utterances, and then analyzing the text data to determine the meaning of the utterances. For example, a system may use a statistical model or a set of rules to determine an action that is most likely being requested by an utterance. If data is displayed on a screen when an utterance is made, the system may use data regarding what content is displayed on a screen to determine hypotheses of utterance meaning. For example, a system may generate a set of hypotheses regarding the meaning of an utterance. The system may increase a score or relative ranking of a hypothesis associated with displayed content, and/or reduce a score or relative ranking of a hypothesis that does not appear to be associated with displayed content. The system may then proceed with the highest scoring hypothesis or N-best hypotheses (wherein N is a positive number) as normal.

Some aspects of the present disclosure relate to context-aware systems that use multi-modal data to improve the accuracy of natural language understanding as it is applied to spoken language input. In some embodiments, a system uses a model designed to identify likely intents and associated named entities in an utterance using both (1) text data regarding the utterance, and (2) contextual data regarding content or other data displayed to a user when the user makes the utterance. For example, an automatic speech recognition ("ASR") subsystem may generate text data representing a transcript or set of words in an utterance, and an application may provide data regarding what was displayed to the user when the utterance was made. A natural language understanding ("NLU") subsystem can then generate or otherwise obtain data representing input vectors using the text data and the contextual data. The NLU subsystem can generate data representing a set of probabilities, scores, tags, labels, or other output using the input vectors and a multi-modal NLU model, and determine the meaning of the utterance using the output of the multi-modal NLU model. In this way, the system may more accurately determine the meaning of an utterance that refers to or otherwise relates to displayed content than systems that do not consider the displayed content when determining the meaning of utterances. In addition, because the system considers the displayed content when generating hypotheses of the meaning of the utterance, the system produces more accurate results than systems that merely re-rank hypotheses generated using conventional processing.

Additional aspects of the present disclosure relate to machine learning architectures that jointly model spoken language input (e.g., spoken commands and other utterances) and contextual data in a different modality (e.g., information displayed on a visual display or data about currently executing applications). Such machine learning architectures can improve upon, and solve problems inherent in, existing spoken language understanding systems that operate in multi-modal contexts. For example, an NLU model used for intent and named entity determination may be implemented as an artificial neural network (also referred to simply as a "neural network" for convenience). The neural-network-based model may be configured to receive input vectors that include data regarding the textual content of an utterance and data regarding visual content displayed on a screen when the utterance was made. The neural-network-based model can be trained to generate data representing scores (e.g., probabilities) that correspond to entity and/or intent labels for words of an utterance based on the context of the words within the utterance and also the data regarding visual content displayed on the screen when the utterances was made.

Although aspects of some embodiments described in the disclosure will focus, for the purpose of illustration, on particular examples of multi-modal input, contexts, models and underlying data associations, the examples are illustrative only and are not intended to be limiting. In some embodiments, the techniques described herein may be applied to additional or alternative input, contexts, models, and the like. For example, although certain embodiments are described herein using neural-network-based models, in some embodiments, other types of models may be used, such as conditional random fields ("CRFs"), maximum entropy models, etc. As another example, although certain embodiments are described herein using data about content presented on a visual display in connection with audio data regarding an utterance, in some embodiments data about currently executing applications may be used in addition to—or as an alternative to—the data about the visually-displayed content. Various aspects of the disclosure will now be described with regard to certain examples and embodiments, which are intended to illustrate but not limit the disclosure.

FIG. 1 is a schematic diagram of an illustrative embodiment in which a user 104 makes an utterance 106, one or more voice-enabled devices 102 detect the utterance 106, and a speech processing system 200 determines the meaning of—and an appropriate response to—the utterance 106.

The voice-enabled device 102 may include a display component 112, such as a monitor, television, screen, or other form of visual display. The voice-enabled device 102 may be in wired or wireless communication (e.g., Bluetooth, ZigBee, etc.) with the display component 112, and the voice-enabled device 102 may control operations of the display component 112 based on utterances 106 that are processed by the speech processing system 200. In some embodiments, the display component 112 may be integrated with the voice-enabled device 102 (e.g., the display component 112 may be physically located within the housing of the voice-enabled device). In some embodiments, the voice-enabled device 102 and display component 112 may be physically separate devices.

The speech processing system 200 may process audio signals received from the voice-enabled device 102 and formulate responses to the user 104. The speech processing system 200 may be implemented as one or more computing devices including one or more servers, desktop computers, laptop computers, or the like. In one example, the speech processing system 200 is configured in a server cluster, server farm, data center, mainframe, cloud computing environment, or a combination thereof. To illustrate, the speech processing system 200 may include any number of devices that operate as a distributed computing resource (e.g., cloud computing, hosted computing, etc.) that provides services, such as storage, computing, networking, and so on.

In some embodiments, the voice-enabled device 102 may have one or more microphones that are used to capture user speech, such as an utterance 106, and one or more speakers that are used to play speech (e.g., computer-synthesized dialogue) or other content. In some embodiments, the voice-enabled device 102 may be designed to operate from a fixed location, and in other embodiments, the voice-enabled device 102 may be portable or mobile. For instance, the voice-enabled device 102 may be a handheld device or other mobile device, such as a smartphone, tablet computer, media player, personal computer, wearable device, etc.

As shown in FIG. 1, a user 104 may interact with a voice-enabled device 102 through an utterance 106. For example, the voice-enabled device 102 may receive utterances from the user 104 via the utterance 106, and provide services in response to the utterances. In some examples, the voice-enabled device 102 may detect a predefined trigger expression or word (e.g., "computer"), which may be followed by directives (e.g., "please end my phone call," "please turn off the alarm," etc.). Services provided by the voice-enabled device 102 in conjunction with the speech processing system 200 may include performing actions, rendering media, obtaining and/or providing information, providing information via synthesized speech via the voice-enabled device 102, initiating Internet-based services on behalf of the user 104, and so forth.

The voice-enabled device 102 may receive sound corresponding to the utterance 106 of the user via one or more microphones. In certain implementations, the utterance 106 may include or be preceded by a wakeword or other trigger expression or event that is spoken by the user 104 to indicate that subsequent user speech is device-directed speech (e.g., speech intended to be received and acted upon by the voice-enabled device 102 and/or speech processing system 200). The voice-enabled device 102 may detect the wakeword and begin streaming audio signals to the speech processing system 200. In some instances, the voice-enabled device 102 may operate in a low-functionality mode and analyze sound using ASR processing. When the wakeword is detected (e.g., using ASR, keyword spotting, etc.), the voice-enabled device 102 may begin streaming the audio signal (and, optionally, other data) to the speech processing system 200. The wakeword may be a reserved keyword that is detected locally by the voice-enabled device 102, such as by using an expression detector that analyzes audio signals produced by the microphones of the voice-enabled device 102 to detect the wakeword, which generally may be a predefined word, phrase, or other sound. Such an expression detector may be implemented using keyword spotting technology, as an example. A keyword spotter is a functional component or algorithm that evaluates an audio signal to detect the presence of a predefined word or expression in the audio signal. Rather than producing a transcription of the words of the speech, a keyword spotter generates a true/false output to indicate whether or not the predefined word or expression is represented in the audio signal.

In the example illustrated in FIG. 1, the user 104 issues an utterance 106 subsequent to a wakeword, which the voice-enabled device 102 captures. The voice-enabled device 102 may produce an audio signal representing the utterance 106. As shown, the voice-enabled device 102 may send the audio signal to the speech processing system 200. In some embodiments, the voice-enabled device 102 may further determine and/or generate, and send additional metadata to the speech processing system 200 that may be used to determine various terms in the utterance 106. For instance, the types of metadata may include data regarding the information currently displayed on the display component 112 (or some other display), snapshots which indicate device states of the voice-enabled device 102, data about the voice-enabled device 102, etc. A snapshot may comprise device states which indicate current operations of the voice-enabled device 102 before, during, and/or after the utterance 106 is detected by the voice-enabled device 102. Device states of the voice-enabled device 102 may represent actions such as, for example, conducting a telephone call, outputting an alarm sound, streaming audio (e.g., music, audio books, etc.), conducting a dialogue with user 104, performing online searches, controlling appliances in a house, or any other type of activity for which a voice-enabled device 102 can be configured to perform. Data about the voice-enabled device 102 may include a device identifier, data regarding components and/or capabilities of the voice-enabled device 102 (e.g., whether the device has a display screen, a touch screen, a speaker, a microphone, a keyboard, etc.), data regarding a network connection available to the voice-enabled device 102, geo-location or local location data regarding the location of the voice-enabled device 102, etc. The additional metadata sent to the speech processing system 200, or data derived therefrom, may be included in the contextual data that is used to perform NLU processing, as described in greater detail below.

While the snapshots of the device states may be sent to the speech processing system 200 when an utterance is detected 106, in other examples, the speech processing system 200 may also store indications of device states rather than receiving them each time an audio signal is received. For example, the speech processing system 200 may receive an indication that the user 104 set an alarm, and know what time the alarm will sound. Thus, once the alarm is sounding, the speech processing system 200 may already have the device state stored and does not receive the snapshots every time an utterance 106 is detected. Similarly, some or all of the metadata may be stored at the speech processing system 200 prior to the utterance 106 being captured by the voice-enabled device 102.

In various examples, an audio signal (and metadata or other associated data) may be sent to the speech processing system 200 over one or more networks 150. The one or more networks 150 may include any viable communication technology, such as wired and/or wireless modalities and/or technologies. Networks 150 may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof.

Figure 2A:
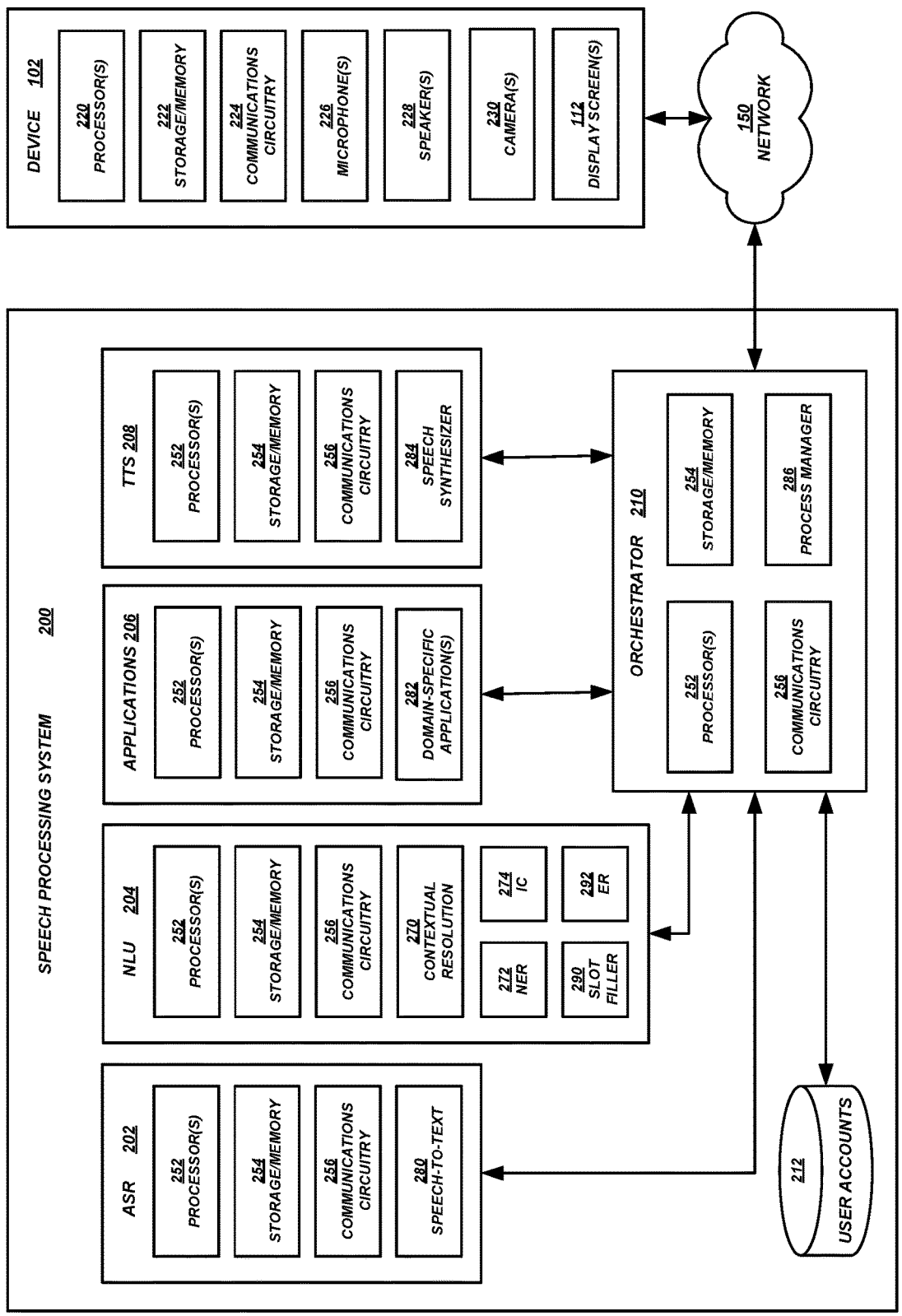
FIG. 2A is an illustrative diagram of the architecture of systems shown of FIG. 1 according to some embodiments.

The speech processing system 200 may include various components for providing the features described herein. In some embodiments, the speech processing system 200 may include an ASR system 202 to process audio signals or other audio data and generate text data representative of user utterances. The speech processing system 200 may also include an NLU system 204 to process text data and contextual data using a multi-modal model 250 and generate semantic representations of user utterances. The speech processing system 200 may also include an applications system 206 that includes or manages one or more applications to respond or otherwise act on user utterances, such as by providing requested content, performed requested operations, and the like. The example subsystems and components of the speech processing system 200 shown in FIG. 1 are illustrative only, and are not intended to be limiting. In some embodiments, a speech processing system 200 may have fewer, additional, and/or alternative components and data stores. A specific, detailed example embodiment of the speech processing system 200 is shown in FIG. 2A and described in greater detail below.

The speech processing system 200 may be implemented on one or more physical server computing devices that provide computing services and resources to end-user devices, such as voice-enabled devices 102. In some embodiments, the speech processing system 200 (or individual components thereof, such as the ASR system 202, NLU system 204, applications system 206, etc.) may be implemented on one or more host devices, such as blade servers, midrange computing devices, mainframe computers, desktop computers, or any other computing device configured to provide computing services and resources. For example, a single host device may execute one or more ASR systems 202, NLU systems 204, application systems 206, some combination thereof, etc. The speech processing system 200 may include any number of such hosts.

In some embodiments, the features and services provided by the speech processing system 200 may be implemented as web services consumable via one or more communication networks. In further embodiments, the speech processing system 200 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

As shown in FIG. 1, the display component 112 may visually present content viewable by the user 104. For example, the display component 112 may present search results for movies available to be purchased, downloaded, streamed, or the like. The display component 112 may present the search results as a list of separate items, such as "Harry Potter," "Interstellar," and so on. The user 104 may view the items on the display component 112, and make an utterance 106, such as "Play Harry Potter." At [A], the voice-enabled device 102 can send an audio signal to the speech processing system 200 via the network 150. For example, the audio signal may be a recording or substantially real-time stream of utterance 106, or the audio signal may include data derived from a recording or substantially real-time stream of the utterance 106.

The ASR system 202 can generate ASR results using the audio signal at [B]. Illustratively, the ASR results may include one or more transcripts or other sets of text data representative of words in the utterance 106. In some examples, the ASR system 202 may generate ASR confidence score data representing the likelihood that a particular set of words of the textual data matches those spoken in the utterance 106. For instance, the ASR system 202 may determine a score representing a confidence or likelihood that a particular word which matches the sounds would be included in the sentence at the specified location (e.g., using a language or grammar model). Thus, each potential textual interpretation of the spoken utterance 106 (hypothesis) is associated with an ASR confidence score. The ASR system 202 may send the ASR results to the NLU system 204 at [C].

The NLU system 204 may obtain contextual data (e.g., metadata or other data) regarding the context of current utterance 106 at [D]. For example, the NLU system 204 may obtain contextual data indicating the content displayed by the display component 112 during the utterance (or last provided for display on the display component 112 before the utterance was made) is a list of movies. In some embodiments, the names of the movies displayed in the listing may also be obtained. In some embodiments, the contextual data, denoted C, may take the form of M key-value pairs, where M is a variable integer that corresponds to the number of items presented on the display component 112. Thus, in the present example, $C=(\{C_{m,\ key}, C_{m,\ value}\})$, for m=1 to M, represents the list of movies currently displayed (e.g., {(Onscreen_Movie, "harry potter") and (Onscreen_Movie, "interstellar")}).

At [E], the NLU system 204 may generate NLU results data, such as a semantic representation of the utterance 106, using the obtained ASR results and contextual data. The NLU system 204 may generate the semantic representation by processing the ASR results and contextual data using a multi-modal model 250 configured to accept both textual data and contextual data as input. In the present example, the utterance "Play Harry Potter" may reasonably be interpreted as a command to play a movie, an audiobook, a soundtrack album, or a game, each of which has a title including the phrase "Harry Potter." However, because the NLU system 204 both (1) obtains contextual data indicating that the movie "Harry Potter" was displayed onscreen when the utterance was made, and (2) uses the multi-modal model 250 that models semantic representations of utterances (e.g., intents and named entities) as a function of both textual data and contextual data, the NLU system 204 can determine that the utterance 106 in this particular example is a command to play the movie rather than the audiobook, soundtrack, game, or some other content. An example process for using contextual data while performing NLU processing is described in greater detail below. The NLU system 204 may send the NLU results to the applications system 206 at [F].

At [G], the applications system 206 can select and initiate an appropriate application to generate a response or otherwise perform an action based on the NLU results. For example, the applications system 206 may include a collection of specialized applications, each directed to a specific domain of intents, and configured to respond to utterances determined to include intents in the corresponding domains. For example, the applications system 206 may include an application in each of the music domain (e.g., Amazon Music, Pandora, Spotify, etc.), video domain (e.g., Amazon Video, HBO, Netflix, Hulu, etc.) household organization domain (e.g., calendars, reminders, timers, alarms, etc.), and other types of domains. In the present example, the spoken command to play the movie "Harry Potter" may be routed to an application in the movie domain that initiates playback of the requested movie in response to the utterance 106.

At [H], the speech processing system 200 can transmit a response to the voice-enabled device 102. In the present example, the response may be a stream of the movie video for "Harry Potter," a command to play a locally-stored copy of the movie, etc. The voice-enabled device 102 may process the response at [I]. In the present example, the voice-enabled device 102 can present the requested move via the display component 112.

Turning now to FIG. 2A, various examples of components of the voice-enabled device 102 and speech processing system 200 architecture of FIG. 1 will be described.

A voice-enabled device 102 may correspond to any suitable type of electronic device including, but are not limited to, desktop computers, mobile computers (e.g., laptops, ultrabooks), mobile phones, smart phones, tablets, televisions, set-top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, eyewear, headsets, etc.), and/or smart accessories (e.g., light bulbs, light switches, electrical switches, etc.). In some embodiments, a voice-enabled device 102 may be relatively simple or basic in structure such that no, or a minimal number of, mechanical input option(s) (e.g., keyboard, mouse, track pad) or touch input(s) (e.g., touch screen, buttons) are included. For example, a voice-enabled device 102 may be able to receive and output audio, and may include power, processing capabilities, storage/memory capabilities, and communication capabilities. However, in other embodiments, a voice-enabled device 102 may include one or more components for receiving mechanical inputs or touch inputs, such as a touch screen and/or one or more buttons.

A voice-enabled device 102, in one embodiment, may include a minimal number of input mechanisms (e.g., a power on/off switch) such that functionality of a voice-enabled device 102 may solely or primarily be through audio input and audio output. For example, a voice-enabled device 102 may include, or be in communication with, one or more microphones that listen for a wakeword by continually monitoring local audio. In response to the wakeword being detected, a voice-enabled device 102 may establish a connection with speech-processing system 200, send audio data to speech-processing system 200, and await/receive a response from speech-processing system 200. In some embodiments, however, non-voice/sound enabled devices may also communicate with speech-processing system 200. For example, in response to a button or touch screen being pressed, or a button or touch screen being pressed and held, a microphone associated with a voice-enabled device 102 may begin recording local audio, establish a connection with speech-processing system 200, send audio data representing the captured audio to speech-processing system 200, and await/receive a response, and/or action to be occur, from speech-processing system 200.

The voice-enabled device 102 may include one or more processors 220, storage/memory 222, communications circuitry 224, one or more microphones 226 or other audio input devices (e.g., transducers), one or more speakers 228 or other audio output devices, one or more cameras 230 or other image capturing components, and a display component 112. However, one or more additional components may be included within a voice-enabled device 102, and/or one or more components may be omitted. For example, a voice-enabled device 102 may also include a power supply or a bus connector. As still yet another example, a voice-enabled device 102 may include one or more additional input and/or output mechanisms, such as one or more sensors (e.g., temperature sensors), one or more buttons, or one or more switches or knobs. Furthermore, while a voice-enabled device 102 may include multiple instances of one or more components, for simplicity only one of each component has been shown.

In some embodiments, a voice-enabled device 102 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, a voice-enabled device 102 may be in communication with an additional processing device including one or more of: processor(s), storage/memory, communications circuitry, microphone(s), speaker(s), camera(s), and/or display screen(s). For example, a centralized control device of a voice-enabled device 102 may include one or more microphone(s). These microphone(s) may generate audio signals, and an electronic device may determine whether or not the audio signals indicate that a wakeword was uttered. If so, then electronic device may cause audio data representing an utterance including the wakeword, or spoken after the wakeword, to be sent to speech-processing system 200.

Processor(s) 220 may include any suitable processing circuitry capable of controlling operations and functionality of a voice-enabled device 102, as well as facilitating communications between various components within a voice-enabled device 102. In some embodiments, processor(s) 220 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 220 may include its own local memory, which may store program systems, program data, and/or one or more operating systems. However, processor(s) 220 may run an operating system ("OS") for a voice-enabled device 102, and/or one or more firmware applications, media applications, and/or applications resident thereon. In some embodiments, processor(s) 220 may run a local client script for reading and rendering content received from one or more websites. For example, processor(s) 220 may run a local JavaScript client for rendering HTML or XHTML content received from a particular URL accessed by a voice-enabled device 102.

Storage/memory 222 may include one or more types of storage mediums such as any volatile or non-volatile memory, or any removable or non-removable memory implemented in any suitable manner to store data for a voice-enabled device 102. For example, data may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 222 may be implemented as computer-readable storage media ("CRSM"), which may be any available physical media accessible by processor(s) 220 to execute one or more instructions stored within storage/memory 222. In some embodiments, one or more applications (e.g., gaming, music, video, calendars, lists, etc.) may be run by processor(s) 220, and may be stored in memory 222.

In some embodiments, storage/memory 222 may include a media system, which may be configured to facilitate communications between electronic device 102 and speech-processing system 200. For example, the media system may store one or more communications protocols that may be executed by processor(s) 220 for facilitating communications for device 102. In some embodiments, a sessions initiation protocol ("SIP") may be used to facilitate media transfer between a voice-enabled device 102 and one or more of speech-processing system 200 and another a voice-enabled device 102. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for a voice-enabled device 102. In some embodiments, a Web Real-Time Communications ("WebRTC") protocols may be employed by a voice-enabled device 102. In a non-limiting embodiment, the media system may include instructions that indicate which communications protocols to employ for facilitating media transfer between devices based on a device type of a voice-enabled device 102. For example, if a voice-enabled device 102 does not include display 112 and/or camera 230, then the media system may indicate that PJSIP should be used, whereas if a voice-enabled device 102 includes display 112 and/or camera 230 then the media system may indicate that WebRTC protocols should be used.

In some embodiments, storage/memory 222 may include one or more systems and/or databases, such as a speech recognition system, a wakeword database, a sound profile database, and a wakeword detection system. The speech recognition system may, for example, include an ASR component that recognizes human speech in detected audio. The speech recognition system may also include an NLU component that determines user intent based on the detected audio. Also included within the speech recognition system may be a text-to-speech ("TTS") component capable of converting text to speech to be outputted by speaker(s) 228, and/or a speech-to-text ("STT") component capable of converting received audio signals into text to be sent to speech-processing system for processing.

The wakeword database may be a database stored locally by storage/memory 204 of a voice-enabled device 102, and may include a list of one or more current wakewords for a voice-enabled device 102, as well as one or more previously used, or alternative, wakewords for the voice-enabled device 102. In some embodiments, an individual may set a wakeword for the voice-enabled device 102. The wakeword may be programmed directly on the voice-enabled device 102, or a wakeword or wakewords may be set by the individual via a local client application that is in communication with speech-processing system 200. For example, an individual may use a mobile device having a speech-processing system client application running thereon to set the wakeword. The specific wakeword may then be communicated from the mobile device to the speech-processing system 200, which in turn may send/notify a voice-enabled device 102 of the individual's selection for the wakeword. The selected activation may then be stored in the wakeword database of storage/memory 222. In some embodiments, additional trigger expressions or permutations of the wakeword may also be stored within storage/memory 222. For example, specific trigger expressions or words that indicate the presence of the wakeword may also be stored within storage/memory 222. In some embodiments, audio watermarks, indicating a specific action or message, may also be stored within storage/memory 222.

In some embodiments, sound profiles for different words, phrases, commands, or audio compositions are also capable of being stored within storage/memory 222, such as within a sound profile database. For example, a sound profile of audio may be stored within the sound profile database of storage/memory 222 on a voice-enabled device 102. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 226 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 226. Rather than producing a transcription of words of the speech, a keyword spotter may generate a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 226. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") based recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In some embodiments, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, a voice-enabled device 102 may then begin transmitting the audio signal to speech-processing system 200 for detecting and responding to subsequent utterances made by an individual.

In some embodiments, storage/memory 222 may store voice biometric data associated with one or more individuals. For example, an individual that operates a voice-enabled device 102 may have a registered user account on speech-processing system 200 (e.g., within a user accounts data store 212). In some embodiments, a voice-enabled device 102 may be associated with a group account, and various individuals may have user accounts that are operating under the rules and configurations of the group account. As an illustrative example, a voice-enabled device 102 may be associated with a first group account on the speech-processing system 200, the first group account being for a family that lives at a household where a voice-enabled device 102 is located. Each family member may also have a user account that is linked to the first group account (e.g., a parent, a child, etc.), and therefore each user account may obtain some or all of the rights of the first group account. For example, a voice-enabled device 102 may have a first group account on speech-processing system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Communications circuitry 224 may include any circuitry allowing or enabling one or more components of a voice-enabled device 102 to communicate with one another, and/or with one or more additional devices, servers, and/or systems. For example, communications circuitry 224 may facilitate communications between a voice-enabled device 102 and speech-processing system 200. As an illustrative example, audio data representing an utterance (e.g., utterance 106 of FIG. 1) may be transmitted over a network 150, such as the Internet, to speech-processing system 200 using any number of communications protocols, such as Transfer Control Protocol and Internet Protocol ("TCP/IP") (e.g., any of the protocols used in each of the TCP/IP layers), Hypertext Transfer Protocol ("HTTP"), WebRTC, SIP, wireless application protocol ("WAP"), etc. Communications circuitry 224 may use any communications protocol, such as any of the previously mentioned exemplary communications protocols. In some embodiments, a voice-enabled device 102 may include one or more antennas to facilitate wireless communications with a network using various wireless technologies (e.g., Wi-Fi, Bluetooth, radiofrequency, etc.). In yet another embodiment, a voice-enabled device 102 may include one or more universal serial bus ("USB") ports, one or more Ethernet or broadband ports, and/or any other type of hardwire access port so that communications circuitry 224 allows a voice-enabled device 102 to communicate with one or more communications networks.

A voice-enabled device 102 may also include one or more microphones 226 and/or transducers. In addition, or alternatively, one or more microphones located within a separate device may be in communication with a voice-enabled device 102 to capture sounds for a voice-enabled device 102. Microphone(s) 226 may be any suitable component capable of detecting audio signals. For example, microphone(s) 226 may include one or more sensors for generating electrical signals and circuitry capable of processing the generated electrical signals. In some embodiments, microphone(s) 226 may include multiple microphones capable of detecting various frequency levels. As an illustrative example, a voice-enabled device 102 may include multiple microphones (e.g., four, seven, ten, etc.) placed at various positions about a voice-enabled device 102 to monitor/capture any audio outputted in the environment where a voice-enabled device 102 is located. The various microphones 226 may include some microphones optimized for distant sounds, while some microphones may be optimized for sounds occurring within a close range of a voice-enabled device 102. In some embodiments, microphone(s) 226 may only begin to detect audio signals in response to a manual input to a voice-enabled device 102. For example, a manually activated device may begin to capture audio data using microphone(s) 226 in response to a user input, such as pressing a button, tapping a touch screen, or providing any touch input gesture to a touch input component.

A voice-enabled device 102 may include one or more speakers 228. Furthermore, a voice-enabled device 102 may be in communication with one or more speaker(s) 228. Speaker(s) 228 may correspond to any suitable mechanism for outputting audio signals. For example, speaker(s) 228 may include one or more speaker units, speaker housings, transducers, arrays of speakers, and/or arrays of transducers that may be capable of broadcasting audio signals and or audio content to a surrounding area where a voice-enabled device 102 may be located. In some embodiments, speaker(s) 228 may include headphones or ear buds, which may be wirelessly wired, or hard-wired, to a voice-enabled device 102, that may be capable of broadcasting audio directly to an individual.

In some embodiments, one or more microphones 226 may serve as input devices to receive audio inputs. A voice-enabled device 102, in the previously mentioned embodiment, may then also include one or more speakers 228 to output audible responses. In this manner, a voice-enabled device 102 may function solely through speech or audio, without the use or need for any input mechanisms or displays, however this is merely exemplary.

Display component 112 may correspond to a display device and/or touch screen, which may be any size and/or shape and may be located at any portion of a voice-enabled device 102. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display component 112 may correspond to a projected capacitive touch ("PCT") screen, including one or more row traces and/or driving line traces, as well as one or more column traces and/or sensing lines. In some embodiments, display component 112 may be an optional component for a voice-enabled device 102. For instance, a voice-enabled device 102 may not include display component 112. Such devices, sometimes referred to as "headless" devices, may output audio, or may be in communication with a display device for outputting viewable content.

Display component 112, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display component 112, a capacitance between the object and the conductive material may be formed. Processor(s) 220 may be capable of determining a location of the touch screen associated with where the capacitance change is detected, and may register a touch input as occurring at that location.

In some embodiments, display component 112 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display component 112 corresponding to where a conductive object contacted display component 112.

A change in capacitance may be measured to determine a location on the touch screen where the object has contacted the surface. For example, if an individual touches a point on display component 112, then a corresponding driving line and sensing line that intersect at that point may be identified. A location of the point may have one or more pixels associated with that location, and therefore one or more actions may be registered for an item or items that are displayed at that location. Processor(s) 220 of a voice-enabled device 102 may be configured to determine which pixels are associated with a particular location point, and which item or items are also displayed at that pixel location. Furthermore, a voice-enabled device 102 may be configured to cause one or more additional actions to occur to the item or items being displayed on display component 112 based on a temporal duration the touch input, and or if one or more additional touch inputs are detected. For example, an object that contacted display component 112 at a first location may be determined, at a later point in time, to contact display component 112 at a second location. In the illustrative example, an object may have initially contacted display component 112 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display component 112 having 100 driving lines and 100 sensing lines may have 100 intersection points, and therefore 100 individual capacitors, while a touch screen display component 112 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by a voice-enabled device 102, and therefore the fewer driving lines and/or sensing lines used, the smaller the amount of power that is needed to operate the touch screen display.

In some embodiments, display component 112 may correspond to a high-definition ("HD") display. For example, display component 112 may display images and/or videos of 720p, 1000p, 1000i, or any other image resolution. In these particular scenarios, display component 112 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1000p or 1000i display may present a 1920 pixel by 1000 pixel image having 2,073,600 pixels. The aforementioned display ratios and pixel numbers are merely exemplary, and any suitable display resolution or pixel number may be employed for display component 112, such as non-HD displays, 4K displays, and/or ultra displays.

In some embodiments, content displayed on display component 112 may be formatted such that contextual entities and lists are able to be analyzed by speech-processing system 200 for list resolution and/or anaphora resolution. Context related to the displayed content may include entities associated with a voice-enabled device 102 including, but not limited to, foreground entities (e.g., lists of items, detail pages), background entities (e.g., songs, audio books), and notification entities. The contextual data may be structured into context entity slots, list metadata, and any other additional data available. For example, contextual entity slots may correspond to data used for list resolution and/or anaphora resolution. The contextual entity slots may be specified in domain definitions with corresponding values. The list metadata may include list identifiers, item identifiers for items of a list, and absolute positions of the list for a particular item (e.g., a first item of a list, a second item of a list, etc.). Such additional data may include unique identifiers associated with an object, item prices, quantities, and the like.

In some embodiments, a voice-enabled device 102 may include one or more cameras 230, corresponding to any suitable image capturing component or components capable of capturing one or more images and/or videos. Camera(s) 230 may, in some embodiments, be configured to capture photographs, sequences of photographs, rapid shots (e.g., multiple photographs captured sequentially during a relatively small temporal duration), videos, or any other type of image, or any combination thereof. In some embodiments, a voice-enabled device 102 may include multiple cameras 230, such as one or more front-facing cameras and/or one or more rear facing cameras. Furthermore, camera(s) 230 may be configured to recognize far-field imagery (e.g., objects located at a large distance away from a voice-enabled device 102) or near-field imagery (e.g., objected located at a relatively small distance from a voice-enabled device 102). In some embodiments, the camera(s) may be high-definition ("HD") cameras, capable of obtaining images and/or videos at a substantially large resolution (e.g., 720p, 1000p, 1000i, etc.). In some embodiments, camera(s) 230 may be optional for a voice-enabled device 102. For instance, camera(s) 230 may be external to, and in communication with, a voice-enabled device 102. For example, an external camera may be capable of capturing images and/or video, which may then be provided to a voice-enabled device 102 for viewing and/or processing.

In some embodiments, display component 112 and/or camera(s) 230 may be optional for a voice-enabled device 102. For instance, a voice-enabled device 102 may function using audio inputs, and outputting audio in response or causing one or more actions to occur in response, and therefore display component 112 and/or camera(s) 230 may not be included. Furthermore, in some embodiments, a voice-enabled device 102 may not include display component 112 and/or camera(s) 230, but instead may be in communication with display component 112 and/or camera(s) 230. For example, a voice-enabled device 102 may be connected to a display screen via a Wi-Fi (e.g., 802.11 protocol) connection such that visual content sent to a voice-enabled device 102 may be sent to the display screen, and output thereby.

In one exemplary embodiment, a voice-enabled device 102 may include an additional input/output ("I/O") interface. For example, a voice-enabled device 102 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of a voice-enabled device 102 may include one or more lights, light emitting diodes ("LEDs"), or other visual indicator(s). In some embodiments, one or more features of the output portion of the I/O interface may be included in a purely voice-enabled version of a voice-enabled device 102. For example, one or more LED lights may be included on a voice-enabled device 102 such that, when microphone(s) 226 receive audio, the one or more LED lights become illuminated signifying that audio has been received by a voice-enabled device 102. In some embodiments, one or more vibrating mechanisms or other haptic features may be included with a voice-enabled device 102 to provide a haptic response to an individual.

In some embodiments, a voice-enabled device 102 may include radiofrequency identification ("RFID") functionality and/or near field communication ("NFC") functionality. Furthermore, in some embodiments, a voice-enabled device 102 may include one or more infrared ("IR") sensors and one or more IR emitters. The IR sensors/emitters may be used to determine depth data. For example, in one embodiment, a distance of an individual from a voice-enabled device 102 may be determined using the one or more IR sensors/emitters. Depth determination may be performed using any depth determination technique. In some embodiments, a distance between an individual and a voice-enabled device 102 may be employed as a basis for presenting content with varying density using display component 112. In some embodiments, a voice-enabled device 102 may include beaconing functionality that allows a voice-enabled device 102 to recognize when one or more devices are located nearby. For example, a voice-enabled device 102 may include beaconing detection functionality that generates a beaconing signal, and attempts to determine whether any devices nearby are capable of detecting that signal. If so, then that may indicate that a particular device is proximate to a voice-enabled device 102.

In some embodiments, contextual data may be obtained by computer vision analysis of an object detected by camera(s) 230. For example, in response to speaking the utterance, "Buy this," a voice-enabled device 102 may cause camera(s) 230 to capture an image. That image may be analyzed to determine what the object is, and the contextual data associated with that object's identity may be determined. For instance, if an individual is holding up a bottle of ketchup, then the computer vision analysis may be able to determine a product name, bar code, and/or any other attribute about the bottle of ketchup from the captured image, and may populate a contextual data structure indicating the determined values (e.g., 'Item Name' slot: "Ketchup").

As shown in FIG. 2A, a speech-processing system 200 may include various subsystems, components, and/or modules including, but not limited to, an ASR system 202, an NLU system 204, applications system 206, a TTS system 208, and a user accounts data store 212. In some embodiments, speech-processing system 200 may also include an orchestrator system 210 capable of orchestrating one or more processes to be performed by one or more of ASR system 202, NLU system 204, applications system 206, and/or TTS system 208, as well as one or more additional components, devices, and/or systems associated therewith. Speech-processing system 200 may also include computer readable media, including, but not limited to, flash memory, random access memory ("RAM"), and/or read-only memory ("ROM"). Speech-processing system 200 may also include various modules that store software, hardware, logic, instructions, and/or commands for speech-processing system 200, such as a speaker identification ("ID") module, or any other module, or any combination thereof.

ASR system 202 may be configured to recognize human speech in detected audio, such as audio captured by a voice-enabled device 102, which may then be transmitted to speech-processing system 200. ASR system 202 may include, in one embodiment, one or more processor(s) 252, storage/memory 254, and communications circuitry 256. Processor(s) 252, storage/memory 254, and communications circuitry 256 may, in some embodiments, be substantially similar to processor(s) 220, storage/memory 222, and communications circuitry 224, which are described in greater detail above, and the aforementioned descriptions may apply. Furthermore, in some embodiments, ASR system 202 may include STT system 280. STT system 280 may employ various speech-to-text techniques.

ASR system 202 may include an expression detector that analyzes audio signals received by speech-processing system 200, such as the expression detector mentioned above with regards to a voice-enabled device 102. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that a particular word or phrase (e.g., a wakeword), is represented within the audio signal. The expression detector may then compare that score to a threshold value to determine whether that word or phrase will be declared as having been spoken.

For instance, ASR system 202 may transcribe received audio data into text data representing the words of the speech contained in the audio data using STT system 280. The text data may then be used by other components for various purposes, such as executing system commands, inputting data, etc. ASR system 202 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 202 may output the most likely text recognized in the audio data. ASR system 202 may also output multiple hypotheses in the form of a lattice or an N-best list with each hypothesis corresponding to a confidence score or other score (such as probability scores, etc.).

ASR system 202 may further attempt to match received feature vectors to language phonemes and words as known in acoustic models and language models stored within storage/memory 254 of ASR system 202. Recognition scores may be determined for the feature vectors based on acoustic data and language data. The acoustic data may be used to calculate an acoustic score representing a likelihood that the intended sound represented by a group of feature vectors matches a language phoneme. The language data may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 202 may generate results data in the form of a single textual representation of the speech, an N-best list including multiple hypotheses and respective scores, and/or lattice, for example, which may be sent to NLU system 204 for processing, such as conversion of the text into commands for execution, either by a voice-enabled device 102, speech-processing system 200, or by another device, such as a separate device or server capable of performing one or more additional functionalities thereon (e.g., a television capable of outputting video content).

NLU system 204 may be configured such that it determines an intent of an utterance based on the received audio data. NLU system 204 may determine one or more domains, which may also be referred to as categories, that may be capable of handling the intent of the utterance. For example, an utterance of "Play this" may be identified by a Music domain, an E-Book domain, and a Video domain as possibly being able to handle the corresponding request. For instance, NLU system 204 may identify that the word "Play" may be a recognized intent of each of the aforementioned domains (as well, possibly, other domains). In some embodiments, after determining an utterance's intent, NLU system 204 may communicate with applications system 206 to cause one or more specific applications to be executed, perform one or more tasks, and/or retrieve an appropriate response or response data. NLU system 204 may include processor(s) 252, storage/memory 254, and communications circuitry 256 which, in one embodiment, may be substantially similar to processor(s) 220, storage/memory 222, and communications circuitry 224 of electronic device 200, and the previous description may apply.

NLU system 204 may include a named entity recognition ("NER") system 272, which may be used to identify portions of text that correspond to a named entity recognizable by NLU system 204. A downstream process called named entity resolution may be configured to link a portion of text to an actual specific known entity. To perform named entity resolution, the system may utilize gazetteer data stored in an entity library storage. The gazetteer data may be used for entity resolution, for example matching ASR results with different entities (such as song titles, contact names, etc.). Gazetteers may be linked to a user account or profile of users accounts data store 212, certain domains (e.g., music or shopping), or may be organized in a variety of other ways.

Generally described, NLU system 204 may take textual input and attempt to make a semantic interpretation of the text. That is, NLU system 204 may be configured to determine a meaning of text based on the individual words and then implements that meaning. In some embodiments, NLU system 204 may interpret a text string to derive an intent or a desired action of the utterance (e.g., utterance 106) as well as the pertinent pieces of information in the text that allow an action to be completed. For example, if a spoken utterance is processed by ASR system 202 and outputs the text, "call mom," NLU system 204 may determine that an intent of the utterance is to activate a telephone, or telephone functionality, and to initiate a call with a contact matching the entity "mom". In some embodiments, NLU system 204 may process several textual inputs related to the same utterance. For example, if ASR system 202 outputs N text segments (as part of an N-best list), then NLU system 204 may process all N outputs.

As will be discussed further below, NLU system 204 may be configured to parse and tag or annotate text. For example, in the text "call mom," the word "call" may be tagged as a command (e.g., a command to execute a phone call), and the word "mom" may be tagged as a specific entity and target of the command (e.g., a telephone number for the entity corresponding to "mom" stored in a contact list). Further, NLU system 204 may be used to provide answer data in response to queries, for example using a knowledge base stored within storage/memory 254 of NLU system 204 and/or storage/memory of speech-processing system 200.

To correctly perform natural language understanding processing of speech input, NLU system 204 may be configured to determine a domain of an utterance. By determining the domain, NLU system 204 may narrow down which services and functionalities offered by an endpoint device (e.g., a voice-enabled device 102, speech-processing system 200, or any other electronic device or system) may be relevant. For example, an endpoint device may offer services relating to interactions with a telephone service, a contact list service, a calendar/scheduling service, a music player service, etc. As another example, an endpoint device may enable certain functionalities for an individual having a user account of speech-processing system 200. Words in a single text query may implicate more than one service, and some services may be functionally linked (e.g., both a telephone service and a calendar service may utilize data from the contact list).

NER system 272 may be configured to receive a query in the form of one or more results from ASR system 202. NER system 272, which is described in greater detail within FIG. 2B, may then attempt to identify relevant grammars and lexical data that may be used to construe meaning of the one or more results. To do so, NER system 272 may begin by identifying potential domains that may relate to the received query. NLU system 204, may include a databases of devices within storage/memory 254 of NLU system 204 that may be used to identify domains associated with specific devices. For example, a voice-enabled device 102 may be associated with domains for music, telephone functionality, calendar data, contact lists, and/or device-specific communications. In addition, NLU system 204 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "shopping," "music," or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical data associated with a particular user account of user accounts data store 212 and/or a voice-enabled device 102. For example, a first gazetteer may include first domain-index lexical data. A user's music-domain lexical data might include album titles, artist names, and song names, for example, whereas a user's contact-list lexical data might include the names of contacts. Since every user's music collection and contact list is presumably different, this personalized data improves entity resolution.

In some embodiments, NLU system 204 may be configured to apply the rules, models, and data applicable to each identified domain. For example, if a query potentially implicates both communications and music, then, substantially in parallel, the natural language understanding processing may use the grammar models and lexical data for communications, and may also use the grammar models and lexical data for music. The responses based on the query produced by each set of models is scored, with the overall highest ranked result from all applied domains is ordinarily selected to be the correct result, which is described in greater detail below with reference to FIG. 2B.

An intent classification ("IC") system 274 may parse the query to determine an intent or intents for each identified domain, where the intent corresponds to the action to be performed that is responsive to the query. Each domain may be associated with a database of words linked to intents. For example, a music intent database of a music domain may link words and phrases such as "play," to a play music intent, "stop," to a stop playing music intent, and "mute" to a mute volume intent. IC system 274 may be configured to identify potential intents for each domain by comparing words in the query to the words and phrases in that domain's intents database.

In order to generate data representing a particular interpreted response, NER system 272 may apply grammar models and lexical data associated with the respective domain to recognize one or more entities in the text of the query. Each grammar model includes the names of entities (i.e., nouns) commonly found in speech about the particular domain (i.e., generic terms), whereas the lexical data from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having fields, also referred to as "slots," to be filled. Each slot may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks may not be structured as sentences, but rather based on associating slots with grammatical tags. As another example, if "Play 'Song 1'" is an identified intent, a grammar framework may correspond to sentence structures such as "Play {Song 1}."

NER system 272 may parse the query to identify words as subject, object, verb, preposition, etc., based on grammar rules and/or models, prior to resolving named entities. The identified verb may be used by IC module 274 to identify intent, which is then used by NER system 272 to identify frameworks. A framework for an intent of "play" may specify a list of slots/fields/placeholders applicable to place the identified "object" such as, for example, {Artist Name}, {Album Name}, {Song Name}, {Application Name}, {Anaphoric Term}, and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Labeling may be performed using an NER model, alone or in combination with heuristic grammar rules. The NER model may be constructed using techniques such as hidden Markov models, maximum entropy models, log linear models, conditional random fields ("CRF"), and the like. In some embodiments, the NER model may be a neural network, as described in greater detail below. In any of these and other embodiments, the NER model may be a multi-modal model configured to generate labeling data (e.g., scores, probabilities, etc. for individual labels) using both text data and contextual data.

For instance, a query of "Play 'Song 1' by 'Artist 1'" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 274 may determine corresponds to the "play music" intent. No determination has been made as to the meaning of "Song 1" and "Artist 1," but based on a models, such as a multi-modal model, it may be determined that the text of these phrases relate to the grammatical object (i.e., entity) of the query.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer data, NER system 272 may search the database of generic words associated with the particular domain. So for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer data, or both may be tried, potentially producing two different results.

The results of the natural language understanding processing may be tagged to attribute meaning to the query. So, for instance, "Play 'Song 1' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," {Intent}: "Play Music," {Artist Name}: "Artist 1," and {Media Type}: Song. Still further, "Add this to my cart'" might produce a result of: {Domain} Shopping, {Intent} "Add item to," {Anaphoric Term}: "this," and {List Type} "cart."

The output from NLU system 204 (which may include tagged text, commands, etc.) may then be sent to orchestrator 210 and/or a command processor, which may be located on, or may be in communication with, speech-processing system 200. The destination command processor may be determined based on the output of NLU system 204. For example, if NLU system 204 outputs include a command to play music, the destination command processor may be a music playing application, such as one located on a voice-enabled device 102 or in a music playing application, configured to execute a music playing command to cause a particular audio file to output. If the output of NLU system 204, however, includes a search request, the destination command processor may include a search engine processor, such as one located on a search server, configured to execute a search command. If the output of NLU system 204 includes a request for enablement of an application's functionalities for a particular user account, then the language model for the user account may be updated to include one or more invocations, utterance frameworks, response frameworks, and values for the frameworks, for a particular application.

In some embodiments, NLU system 204 may also include an entity resolution module 292, which allows NLU system 204 to query each domain of NLU system 204 to determine which domain or domains believe that they can handle a given request. Upon performing the query, each domain of NLU system 204 may return a "score" indicating a likelihood that they can handle the application in question. For instance, various domains may return scores of LOW, MEDIUM, or HIGH, indicating the likelihood that they can handle the particular application. Entity resolution module 292 may return application names or titles for the request, which may be based on relevance scores that estimate a confidence that a particular application may be best used for the request. As an illustrative example, if the utterance is, "Play my music," NLU system 204 may determine, using entity resolution module 292, which domains, and thus applications, can likely handle this request, and may select the domain and/or application having the highest confidence score as being the domain and/or application able to handle the request. Furthermore, as described in greater detail below with reference to FIG. 2B, NLU system 204 may further include a slot filler module 290.

In some embodiments, NLU system 204 may include a contextual resolution system 270, which may be a system configured to identify entities for assisting natural language understanding processing using contextual data corresponding to content being displayed by display component 112. Contextual resolution system 270 may receive contextual data from orchestrator 210 (e.g., that may be generated and sent from a particular domain or application) and/or from a voice-enabled device 102. The contextual data may include data associated with the particular content currently being rendered by a requesting device, such as voice-enabled device 102. In some embodiments, the contextual data may be obtained in response to receiving audio data. For example, in response to receiving audio data representing utterance 106, the voice-enabled device 102 may send a context notification to speech-processing system 200 that indicates that content is currently being rendered by display component 112.

In one embodiment, orchestrator 210 may be configured to receive the audio data, and may determine that the context notification has also been received. Orchestrator 210 may determine whether or not the context notification indicates that there is (or was) content displayed by display component 112 at the time that the utterance was spoken (e.g., when the wakeword was uttered, or when the utterance finished). In some embodiments, the determination of whether content is being displayed by display component 112 may correspond to a time just prior to the wakeword being uttered, when the wakeword was uttered, after the wakeword was uttered, during the utterance being spoken, after the utterance was spoken, and/or after the audio data is sent to speech-processing system 200, and the aforementioned is merely exemplary. The context notification may correspond to a flag, such as a logical 1/0, where if the flag has a value of 1, then this may indicate that content is being rendered by a voice-enabled device 102, whereas if the flag has a value of 0, then this may indicate that not content is being rendered by a voice-enabled device 102.

Upon determining that a voice-enabled device 102 is rendering content (e.g., receiving a context notification indicating that content is being displayed by display component 112), orchestrator 210 may generate and send a request to the various domains associated with applications system 206 and NLU system 204. The request may inquire as to which domain, or domains, are currently providing a voice-enabled device 102 with content, such as the content being rendered. Upon determining the domain, or domains, that are providing content, orchestrator 210 may request that the identified domain(s) generate and send contextual data representing text corresponding to the displayed content. After receiving the contextual data from the corresponding domain(s), orchestrator 210 may provide the contextual data to contextual resolution system 270, or otherwise cause the contextual data to be sent to NLU system 204.

In some embodiments, the various domains may include formatting logic (e.g., speechlets) that may format the contextual data. The contextual data may be structured, in response to the formatting logic applying its formatting rules, such that attributes of the content are arranged in contextual slots including values associated with those slots. For instance, the contextual data may also be referred to, or may generally correspond to, entity data representing content being displayed by display component 112 during a time when an utterance is spoken. For example, a move search results page showing a listing of movies including "Harry Potter" and "Interstellar" may correspond to contextual data such as {(Onscreen_Movie, "harry potter"), (Onscreen_Movie, "interstellar")}).

The contextual data obtained by the contextual resolution system 270 or otherwise may be used by a multi-modal model 250 trained to generate results using multi-modal input. For example, the multi-modal input may include input from both the ASR system 202 (e.g., text data, generated by the ASR system 202, representing words in an utterance) and also the contextual data (or data derived therefrom). Using a model trained to generate output from both ASR output and contextual data can improve the process of resolving which entities are properly assigned to which slots, or it may eliminate the need for a separate resolution process. In some embodiments, the NLU system 204 may use such a model instead of, or in addition to, the rules and processes of the contextual resolution system 270 described herein. Examples of a multi-modal model 250 and an example process for using such a model 250 are described in greater detail below.

In some embodiments, in addition to using a multi-modal model 250 as described above and in greater detail below, the contextual resolution system 270 may determine whether any slots/fields from intent resolution processing by NLU system 204 substantially match any slots/fields from the contextual data received. For instance, the entity data that is received from the domain may include similar entities (e.g. slots) as the entities associated with the intent identified by NLU system 204. This may include having contextual slots from the contextual data being associated with similar attributes as those of slots from intent resolution by NLU system 204. As an example, the "Play Music" intent may include slots for application data—{Application Data Slot}, song name—{Song Name}, album name—{Album Name}, artist name—{Artist Name}, genre name—{Genre Name}, playlist name {Playlist Name}, media type—{Media Type}, sort type—{Sort Type}, play mode—{Play Mode}, service name—{Service Name}, anaphor—{Anaphor}, list position—{List Position}, recommend trigger—{Recommended Trigger}, and similar trigger—{Similar Trigger}. From NLU system 204, the text data may be used to identify some or all of the values for these slots. For example, if the utterance is, "Play 'Song 1'," then {Song Name} may have a value "Song 1." However, the remaining slots may remain unfilled. The contextual data may indicate data regarding a GUI displayed by display component 112, where the GUI includes a detailed page associated with a song (e.g., "Song 1") or be a list including one item, the song. For example, the contextual data may include a song name contextual slot, {Song Name}, with a filled value being "Song 1," as well as an album name contextual slot, {Album Name}, having a filled value "Album 1." In this particular scenario, the album name contextual slot {Album Name} may be provided to NLU system 204.

Contextual resolution system 270 may, in some embodiments, be configured to determine that one or more of the declared slots from the intent matches one or more contextual entity slots from the contextual data. This may allow for resolution of the entity based on the contextual data. For example, if an individual says, "Play 'Song 1'," and the contextual data indicates that there is a contextual entity slot {Song Name} having a value "Song 1," then the specific song to be played may be determined to be the audio file associated with "Song 1."

Contextual resolution system 270, in one embodiment, may be configured to determine a heuristics score that indicates a number of matching entities (e.g., matching slots) between the entity data/contextual data and the declared slots for the identified intent. For example, using the previous example, the contextual data may include such slots as {Song Name}, {Album Name}, and/or {Artist Name}, amongst other slots. Therefore, in this particular scenario, the heuristics score may be three, indicating that there are three slots corresponding to similar entities for both the declared slots from IC component 274 and contextual resolution system 270. If the heuristics score is greater than zero, then NLU system 204 may be configured to generate a selected context file that may be included with the output data from NLU system 204, which orchestrator 210 may provide back to an application, or applications, of applications system 206 to perform, or attempt to perform, one or more actions.

Applications system 206 may, for example, correspond to various action specific applications 282, which are capable of processing various task specific actions and/or performing various functionalities. Applications system 206 may further correspond to first party applications and/or third party applications capable of performing various tasks or actions, or performing various functionalities. For example, based on the context of the audio received from a voice-enabled device 102, speech-processing system 200 may use a certain application 282 to generate a response, or to obtain response data, which in turn may be communicated back to a voice-enabled device 102 and/or to another electronic device (e.g., a television). Applications system 206 may also include processor(s) 252, storage/memory 254, and communications circuitry 256.

In some embodiments, an application 282 of applications system 206 may be written in various computer languages, such as JavaScript and Java. Various applications 282 may include an intent schema file and a sample utterances file, such as, for example, an IntentSchema.json file including the JSON defining the intents of a particular application, and a SampleUtterances.txt file including plain text sample utterances for the particular application. Applications 282 may also include application-specific code, such as a JavaScript or Java file, common library code, and various other JavaScript or Java modules.

TTS system 208 may employ various text-to-speech techniques. TTS system 208 may also include processor(s) 252, storage/memory 254, communications circuitry 256, and speech synthesizer 284.

User accounts data store 212 may store one or more user accounts or user profiles, corresponding to users having an account on speech-processing system 200. For example, a parent may have an account registered on speech-processing system 200, and each of the parent's children may have their own user profile registered under the parent's account. Data, settings, and/or preferences, for example, for each user profile may be stored by user accounts data store 212. In some embodiments, user accounts data store 212 may store a voice signal, such as voice biometric data, for a specific user profile. This may allow speaker identification techniques to be used to match a voice to voice biometric data associated with a specific user profile. In some embodiments, user accounts data store 212 may store a telephone number assigned to a particular user profile. In some embodiments, user accounts data store 212 may include a list of media items currently stored within an individual's registered account or user profile. For example, a list of music or videos purchased or obtained by an individual may be stored within the individual's user profile on user accounts data store 212, which may be accessed by the individual when the individual seeks to hear a particular song or songs, or view a particular video or videos. User accounts data store 212 may also include a listing of all applications currently enabled for each user profile. In some embodiments, NLU system 204 may receive indications of which applications are currently enabled for a particular user profile or account, such that NLU system 204 is aware of which rules and capabilities that speech-processing system 200 is able to perform for the particular user profile or account.

Orchestrator 210, in a non-limiting embodiment, may correspond to any suitable device, system, and/or logic capable of performing one or more processes. For example, orchestrator 210 may include a process manager 286 configured to request contextual data from one or more domains/applications of applications system 206 in response to receive a notification from a voice-enabled device 102 that content is currently being rendered thereby. In response to receiving the contextual data, process manager 286 may be configured to provide the contextual data to NLU system 204. In one embodiment, orchestrator 210 may include processor(s) 252, storage/memory 254, and communications circuitry 256.

Although each of ASR system 202, NLU system 204, applications system 206, TTS system 208, user accounts data store 212, and orchestrator 210 may each include instances of processor(s) 252, storage/memory 254, and communications circuitry 256, those instances of processor(s) 252, storage/memory 254, and communications circuitry 256 within each of ASR system 202, NLU system 204, applications system 206, TTS system 206, user accounts data store 212, and orchestrator 210 may differ. For example, the structure, functionality, and style of processor(s) 252 within ASR system 202 may be substantially similar to the structure, functionality, and style of processor(s) 252 within NLU system 204, however the actual processor(s) 252 need not be the same entity.

Figure 2B:
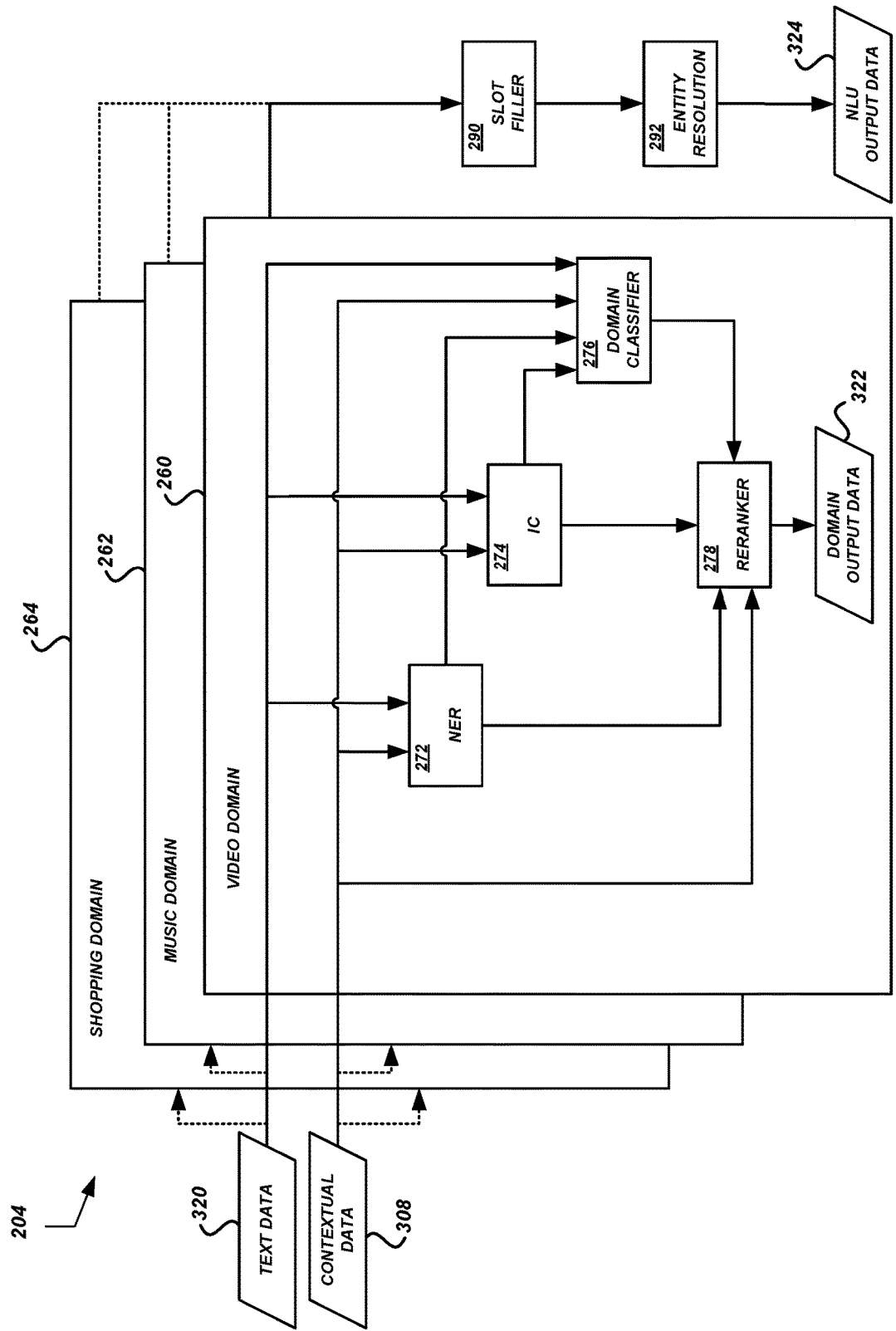
FIG. 2B is an illustrative diagram of a multi-domain architecture for an NLU system of FIG. 2A according to some embodiments.

FIG. 2B is an illustrative diagram of a multi-domain architecture for NLU system 204 of FIG. 2A, in accordance with various embodiments. In the multi-domain architecture of NLU system 204, each domain (which may include a set of intents and entity slots that define a larger concept such as music, books, etc.) may be constructed separately and be made available to NLU system 204 during runtime operations where natural language understanding functionality operations are performed on text (such as text output from ASR system 202). Each domain may have specially configured components to perform various steps of the NLU operations. For instance, each domain may include a contextual resolution system 270, an NER system 272, and/or an IC system 274, which may be specific to that particular domain. In some embodiments, a domain may include a slot filler system 290 and/or entity resolution system 292 that may be configured to perform their corresponding functions without deferring until after domain ranking has occurred. Furthermore, a language model associated with a particular user account may specify various input and output characteristics of NLU system 204, which may vary from user to user based on that particular user's language model.

In the illustrative embodiment, a videos domain 260 (Domain A) may have an NER component 272 that identifies what slots, fields, or placeholders (i.e., portions of input text) may correspond to particular entities relevant to that domain. The NER component 272 may use a machine learning model, such as a multi-modal model 250, to both identify the portions corresponding to an entity as well as identify what type of entity corresponds to the text portion. The NER component 272 may generate slot score data using the model 250, text data 320 from the ASR system 202, and contextual data 308 from the contextual resolution system 270. The slot score data may include, for each slot associated with the current domain (the videos domain 260 in this example), a confidence score representing a likelihood that an entity corresponds to the slot. Each score represented by the slot score data may be a binned designator (e.g., low, medium, high, or any other binned designator). Alternatively, each score may be a discrete value (e.g., 0.2, 0.5, 0.8, etc.). For example, for text data 320 representing "Play 'Harry Potter'" and contextual data 308 indicating that a listing of movies including "Harry Potter" are being displayed, an NER component 272 trained for the videos domain 260 may generate slot score data indicating that the portion of text (e.g., "Harry Potter") most likely corresponds to an entity and a video name slot.

Videos domain 260 may also have its own intent classification (IC) component 274 that determines the intent of the text, assuming that the text is within the proscribed domain. IC components may use a model, such as a multi-modal model 250. The model 250 may be the same model 250 as used by the NER component 272 (e.g., a multitask model trained to produce labelling output for both named entities and intents), or it may be a separate multi-modal model 250 (e.g., a single task model trained to produce labelling output for intents but not named entities). The IC component 274 may generate intent score data using the model 250, text data 320, and contextual data 308. The intent score data may include, for each intent label associated with the videos domain 260, a confidence score representing a likelihood that the intent label (or the intent associated with the intent label) associated therewith is associated with the text data 320. Each score represented by the slot score data may be a binned designator (e.g., low, medium, high, or any other binned designator). Alternatively, each score may be a discrete value (e.g., 0.2, 0.5, 0.8, etc.). For example, for text data 320 representing "Play 'Harry Potter'" and contextual data 308 indicating that a listing of movies including "Harry Potter" are being displayed, an IC component 274 trained for the videos domain 260 may generate intent score data indicating that the text data most likely corresponds to a "play video" intent.

Videos domain 260 may also have its own domain classifier component 276 that generates domain score data including a confidence score representing a probability that a textual interpretation represented in the text data 320 corresponds to the domain. The domain classifier component 276 may be a one-vs-all ("OVA") classification component. For example, the domain score data output from the domain classifier component 276 may represent a probability that the textual interpretation is associated with the current domain (the videos domain 260 in this example) rather than other domains of the NLU component 204. In some embodiments, the domain classifier component 276 takes as input the text data 320. The domain classifier component 276 may optionally take as input the intent score data, slot score data, and/or the contextual data 308. The intent score data input into the domain classifier component 276 may include an N-best list of scores indicating likelihoods that respective intents of the domain may be associated with one or more textual interpretations represented in the text data 320. The slot score data input into the domain classifier component 276 may include an N-best list of scores indicating likelihoods that slots of the domain may be associated with one or more textual interpretations represented in the text data 320. The confidence score may be a binned designator (e.g., low, medium, high, or any other binned designator). Alternatively, the confidence score may be a discrete value (e.g., 0.2, 0.5, 0.8, etc.). The domain classifier component 276 may use a plurality of maximum entropy classifiers. The number of maximum entropy classifiers used by the domain classifier component 276 may correspond to the number of domains implemented by the NLU component. In order to train the domain classifier component 276, the training utterances specific to the domain implementing the domain classifier component 276 may be retained and the training utterances associated with all other domains may be relabeled, for example with an "Out of Domain" label. This enables the domain classifier component 276 to operate with respect to a specific domain while being trained on as many data samples as a multi-domain classifier component.

The processes performed by the NER component 272, IC component 274, and domain classifier 276 of a particular domain may be performed substantially in parallel such that the processes of one component are not contingent upon the processes of another component.

Videos domain 260 may additionally include a reranker component 278. The reranker component 278 may take as input a three dimensional vector including a first dimension corresponding to the intent score data for the domain, a second dimension corresponding to the slot score data for the domain, and a third dimension corresponding to the domain score data for the domain. The reranker component 278 may use a model, such as a log-linear model having a cost function similar to a cross-domain ranker, to generate confidence score data for each textual interpretation. That is, the reranker component 278 of the videos domain 260, although operating specific to the domain, may be trained using training data (e.g., examples of textual interpretations and corresponding intents/domains/slots or other known NLU results) associated with multiple domains. Confidence score data generated by the reranker 278 for a textual interpretation may be based on the slot score data associated with the textual interpretation output by the NER component 272, the intent score data associated with the textual interpretation output by the IC component 274, and the confidence score data associated with the textual interpretation output by the domain classifier component 278. Thus, the confidence score data generated for a textual interpretation output by the reranker component 278 represents a likelihood that the textual interpretation relates to the domain based on one or more intents derived from the textual interpretation, one or more slots determined for the textual interpretation, as well as other factors. The reranker component 278 may rank the textual interpretations based on the scores generated by the reranker component 278 for each textual interpretation, and therefrom create an N-best list of NLU results where the N-best list corresponds to the particular domain and the input text data 320. The reranker component 278 may output the N-best list of NLU results for further processing by other components of the NLU component 204. Each item of the N-best list may include a respective calibrated score. Alternatively, the reranker component 278 may output data representing the highest scoring result for the particular domain.

The reranker component 278 may take as input other contextual data 308 as well, and use such data to determine domain output data. Contextual data 308 may be generated by the contextual resolution system 270, as described in greater detail above. In some embodiments, the contextual data 308 may indicate what information was displayed on a display component 112 of a voice-enabled device 102 when an utterance, represented by the text data 320, was made. In some embodiments, the contextual data 308 may also or alternatively indicate a type and/or a mode of operation of the voice-enabled device 102 from which the audio data corresponding to the spoken utterance was received. For example, if the contextual data 308 indicates the voice-enabled device 102 is a smart television, a reranker component 278 associated with a video domain 260 may increase a score that was generated based solely on the three dimensional vector input into the reranker component 278 whereas a reranker component 278 associated with a weather domain may decrease a score that was generated based solely on the three dimensional vector input into the reranker component 278. For further example, if the contextual data 308 indicates the voice-enabled device 102 is a headless device, a reranker component 278 associated with a music domain 262 may increase a score generated based solely on the three dimensional vector input into the reranker component 278 whereas a reranker component 278 associated with a video domain 260 may decrease a score generated based solely on the three dimensional vector input into the reranker component 278. The examples of contextual data 308 described herein are illustrative only, and are not intended to be limiting. In some embodiments, additional or alternative forms of context data 308 may be used, such as user identification data, user presence data, scores output by a ranker and/or reranker of another domain, etc.

The recognizer output data may include a single textual interpretation, or to an N-best list of data corresponding to multiple textual interpretations. Output from each recognizer (and more specifically output from the reranker component 278 of each recognizer) may be compiled into a cross-domain N-best list represented in cross-domain N-best list data. The N-best list represented in the cross-domain N-best list data may represent one or more textual interpretations represented in the text data 320 since each domain receives the same textual interpretations as input and may output the same or different textual interpretation as being the most likely textual interpretation that corresponds to the respective domain.

The domain output data 322 for a particular domain (e.g., the output of the reranker component 278 of the videos domain 260) may represent intents and slots corresponding to the domain's top choices as to the meaning of one or more textual interpretations represented in the text data 320, along with scores for each item. For example, for text data 320 representing the utterance "Play Harry Potter" while the movies "Harry Potter and the Sorcerer's Stone" and "Interstellar" are displayed on a display component 112, a video domain 260 reranker 278 may generate domain output data 322 in the form of an N-best list such as:

(0.95) PlayMovieIntent Title: "Harry Potter and the Sorcerer's Stone"
(0.02) PlayMovieIntent Title: "Harry Potter and the Deathly Hallows Part 2"
(0.02) PlayMovieIntent Title: "Harry Potter and the Deathly Hallows Part 1"
(0.01) PlayMovieIntent Title: "Interstellar"

Each item in the N-best list may be associated with a respective score, such as a score generated by the reranker 278 or some other component.

The NLU system 204 may include domain-specific recognizers for each of multiple domains, and each of the domain-specific recognizers may include their own NER component 272, IC component 274, domain classifier component 276, and/or reranker 278. For example, as shown in FIG. 2B, the NLU system 204 may include recognizers for a music domain 262 and a shopping domain 264 in addition to a video domain 260.

The outputs of the recognizers of the NLU system 204 may take the form of a multi-domain N-best list that includes the domain output data 322 generated by each domain-specific recognizer. An example of a multi-domain N-best list created using domain output data 322 from a videos domain 260, music domain 262, and shopping domain 264 may include the following elements:

(0.78) Video PlayMovieIntent Title: "Harry Potter and the Sorcerer's Stone"
(0.13) Music PlayMusicIntent SongTitle: "Harry Potter Main Theme"
(0.07) Shopping BuyItemIntent Name: "Harry Potter" Type="Book"
(0.02) Video PlayMovieIntent Title: "Harry Potter and the Deathly Hallows Part 2"

The NLU system 204 may also include a slot filler component 290. The slot filler component 290 can take text from slots and alter it to make the text more easily processed by downstream components. The operations of the slot filler component 290 are typically low latency operations that do not involve heavy operations such as reference to a knowledge base. The purpose of the slot filler component 290 is to replace words with other words or values that may be more easily understood by downstream components. For example, if a textual interpretation represented in the text data 320 included the word "tomorrow," the slot filler component 290 may replace the word "tomorrow" with an actual date for purposes of downstream processing. Similarly, a word "CD" may be replaced by a word "album" of the words "compact disc." The replaced words may then be included in the cross-domain N-best list data.

The cross-domain N-best list data may then sent to an entity resolution component 292. The entity resolution component 292 can apply rules or other instructions to standardize labels or tokens from previous stages into an intent/slot representation. The precise transformation may depend on the domain (e.g., for a travel domain a text mention of "Boston airport" may be transformed to the standard BOS three-letter code referring to the airport). The entity resolution component 292 can refer to an authority source (such as a knowledge base) that is used to specifically identify the precise entity referred to in the entity mention identified in each slot represented in the cross-domain N-best list data. Specific intent/slot combinations may also be tied to a particular source, which may then be used to resolve the text. In the example "play songs by the stones," the entity resolution component 292 may reference a personal music catalog, Amazon Music account, user account, or the like. The output from the entity resolution component 292 may include altered N-best list data that is based on the cross-domain N-best list represented in the cross-domain N-best list data, but may also include more detailed data (e.g., entity IDs) about the specific entities mentioned in the slots and/or more detailed slot data that can eventually be used by an application 282 which may be incorporated into the same system components or pipeline or may be on a separate device in communication with the NLU system 204. Multiple entity resolution components 292 may exist where a particular entity resolution component 292 may be specific to one or more domains.

The NLU system 204 may produce NLU output data 324 from the N-best list data described above. The NLU output data 324 may include a highest-scoring interpretation from the cross-domain N-best list data, or it may be data representing an N-best list of highest-scoring interpretations. In some embodiments, the NLU system 204 may re-score, bias, or otherwise alter the N-best list data generated by the entity resolution component 292. To do so, the NLU system 204 may consider not only the N-best list data generated by the entity resolution component 292, but may also consider other data. The other data may include a variety of data. For example, the other data may include application rating or popularity data. For example, if one application has a particularly high rating, the NLU system 204 may increase the score of results associated with that particular application. The other data may also include data about applications that have been specifically enabled by the user (as indicated in a user account). NLU output data associated with enabled applications may be scored higher than results associated with non-enabled applications. User history may also be considered, such as if the user regularly uses a particular supplemental application or does so at particular times of day. Date, time, location, weather, type of device 102, user ID, context, and other data may also be considered. For example, the NLU system 204 may consider when any particular applications are currently active (e.g., music being played, a game being played, etc.). The highest scoring result (or results in the case of multiple textual interpretations corresponding to multiple intents) may be passed to a downstream application for execution.

In some embodiments, NLU system 204 may include contextual resolution system 270, which may be employed to assist in resolving certain entities based on contextual data associated with displayed content. For example, a voice-enabled device 102 may display a detail web page of an item available for purchase by an individual. The detail web page may include contextual data indicating various entities associated with the item such as, but not limited to, an item name—{Item Name}, an item identifier—{Item Identifier}, and the like. In some embodiments, the contextual data may also include an anaphoric term, {Anaphoric Term}. If the text of an utterance is, for example, "Buy this," then NLU system 204 may identify that the intent as being a purchasing intent having an entity resolution "Buy," and may also include an anaphoric term "this." Based on this information available from the text data, the purchasing domain may not be able to determine the specific action to perform because the entity "this" may not be able to be associated with a particular item. In this illustrative example, the contextual data may assist an application for resolving missing entities. Contextual resolution system 270 may determine which, if any, entities match between the contextual data and the declared slots for a particular domain. For example, the purchasing intent may include a slot for an item name, and the contextual data may also include a slot for item name having a particular value associated with it. After shopping domain 264 outputs data including any resolved entities, contextual resolution system 270 may append the contextual data including the slot and the particular value associated with that slot to the output data. The output data may then be passed to the corresponding application identified by NLU system 204, and the application may use the output data including the selected context file to process the request. In one example, if a coffee maker having an item name "Coffee Maker" is displayed on display component 112, then the contextual data may include a contextual slot for the entity {Item Name} having a value being "Coffee Maker." Furthermore, a unique identifier associated with the coffee maker having the item name "Coffee Maker" may be included for processing by shopping domain 262. Therefore, when shopping domain 264 outputs data to a shopping application, that output data may include contextual data indicating the unique identifier associated with the item.

Figure 3A:
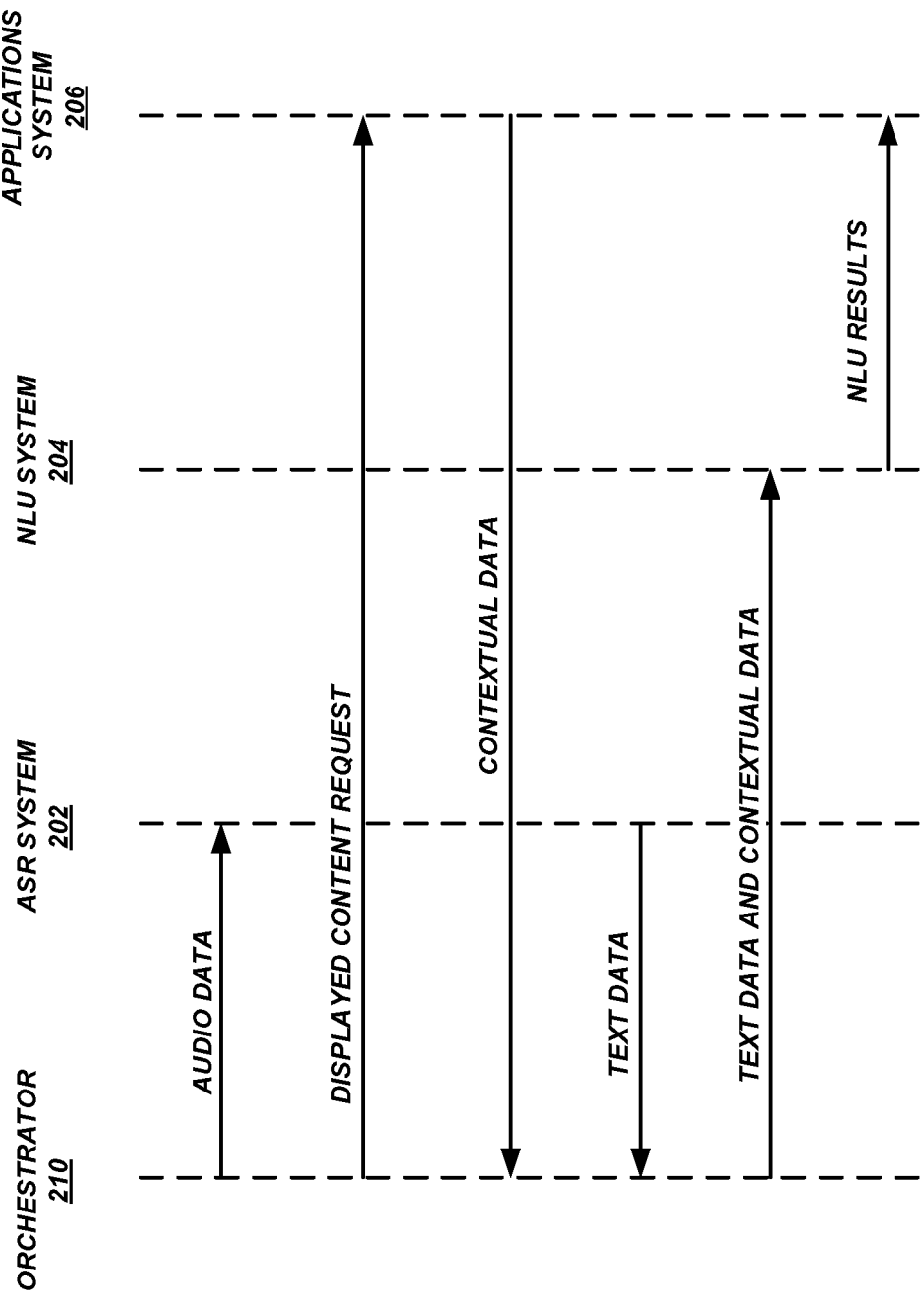
FIG. 3A is an illustrative diagram of a process flow for the system architecture of FIG. 2A according to some embodiments.

FIG. 3A is an illustrative diagram of a process flow for the system architecture of FIG. 2A, in accordance with various embodiments. As seen by FIG. 3A, upon receipt of audio data representing an utterance (e.g., utterance 106), orchestrator 210 of speech-processing system 200 may cause the audio data to be sent to ASR system 202. Similarly, at a substantially same time, orchestrator 210 may determine whether a context notification was received from a voice-enabled device 102, and if that notification indicates that content is currently being rendered by a voice-enabled device 102. For example, a context notification corresponding to a logical 1 may be received that indicates that display component 112 is currently displaying content. In response to receiving the context notification, orchestrator 210 may generate and send a displayed content request to applications system 206.

Applications system 206 may include various applications, and the domains associated with the applications. For example, applications system 206 may include various video player applications, each of which may be associated with a video domain. Upon receiving the displayed content request, applications system 206 may determine which application, or applications, are currently providing content to a voice-enabled device 102. After identifying the particular application, or if more than one, applications, formatting logic for each application (e.g., a speechlet) may be applied to text corresponding to the content to generate contextual data. The contextual data may be formatted such that the text is parsed into contextual slots associated with the particular domain with which the application responsible for providing the content is associated. For example, if the video player application is providing a listing of available movies to a voice-enabled device 102, the contextual data may be generated such that text corresponding to the individual is identified as data associated with the video domain (Onscreen_movie). Furthermore, the contextual data may also include values attributed to the identifiers. For example, if the displayed content includes two entries—an option to select a movie having a name "Harry Potter" and an option to select a moving having a name "Interstellar," then the contextual data may include entries such as "({Onscreen_movie, "harry potter"}, {Onscreen_movie, "interstellar"}." In one embodiment, the contextual data may be sent to NLU system 204 upon being generated by applications system 206. In some embodiments, the contextual data, upon being generated by applications system 206, may be provided to orchestrator 210, which in turn may cause the contextual data to be provided to NLU system 204. Similarly, orchestrator 210 may also receive text data representing the audio data from ASR system 202. In some embodiments, orchestrator 210 may be further configured to cause the text data (and the contextual data, if received from applications system 206) to NLU system 204. The text data and the contextual data need not be received by NLU system 204 at a substantially same time, and the illustrative embodiment is merely exemplary. For example, the text data may be received by NLU system 204 prior to the contextual data.

After receiving the text data, NLU system 204 may determine an intent of the utterance, and may attempt to resolve one or more entities associated with the intent, using the text data and the contextual data. The NLU system 204 may use a multi-modal model 250 to determine intent and/or named entity labels for individual words or phrases of the text data. Illustratively, a determined intent and one or more associated named entities may be formatted into a domain-specific intent framework, including filling slots with the named entities. The NLU system 204 may then send its output to the applications system 206, orchestrator 210, or some other system or component of the speech processing system 200.

In some embodiments, after filling-in one or more slots with a value obtained from processing the text data and contextual data using one or more multi-modal models 250, NLU system 204 may determine, using contextual resolution system 270, whether any entities from the entity data representing the displayed content match any of the entities from the intent. If so, then contextual resolution system 270 may place the matching entities into a selected context file, and output data from NLU system 204 may be generated including the resolved entities, if any, and the selected context file. The output data may then be passed back to the identified application, or applications, associated with the determined intent, and one or more actions (e.g., causing a song to play, purchasing an item), may be performed.

Figure 3B:
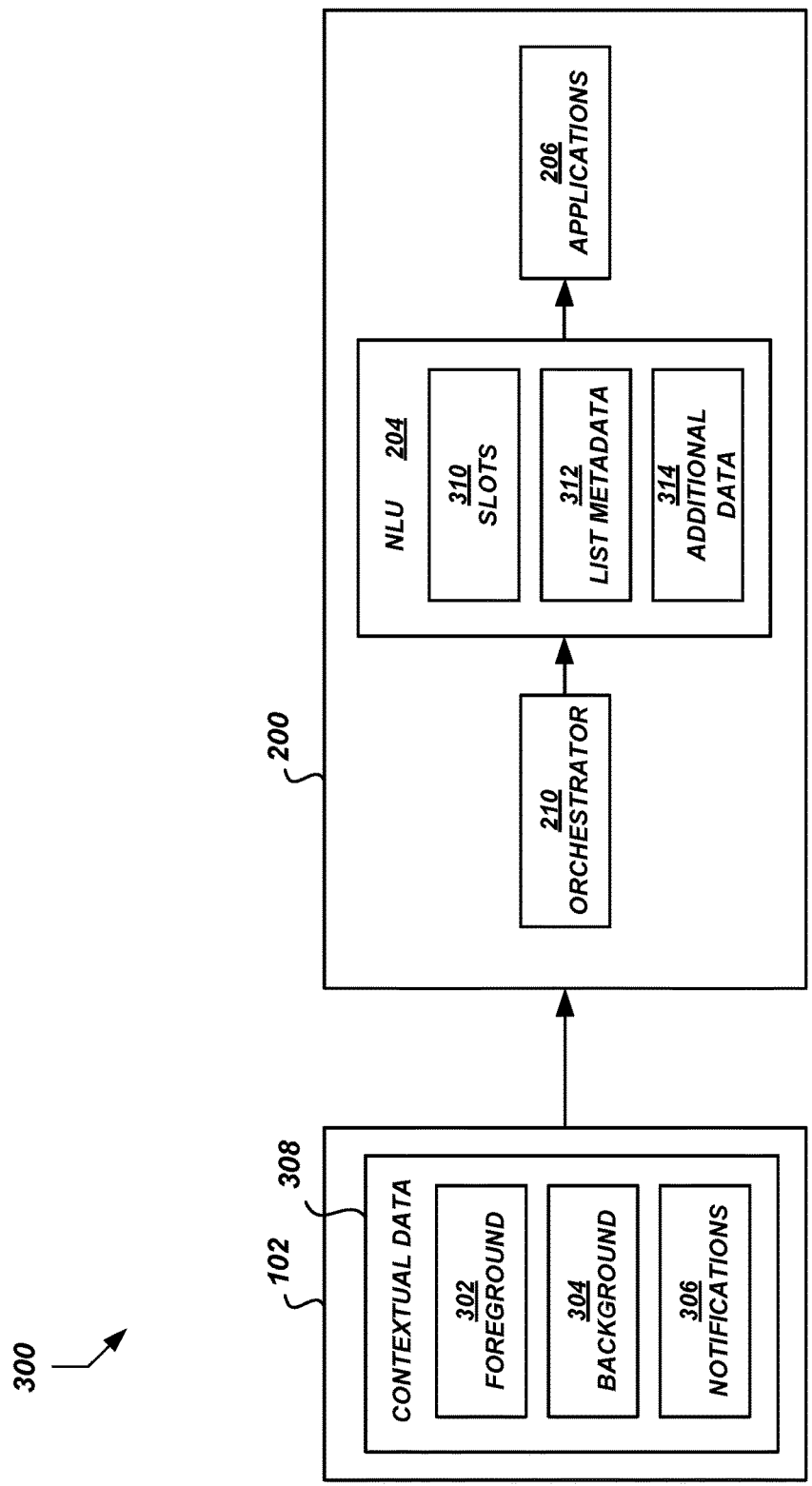
FIG. 3B is an illustrative diagram of an exemplary system indicating techniques for contextual data to be provided to an NLU system according to some embodiments.

FIG. 3B is an illustrative diagram of an exemplary system indicating techniques for contextual data to be provided to an NLU system from a device, in accordance with various embodiments. System 300, in the non-limiting embodiment, indicates a process by which a voice-enabled device 102 may provide contextual data to speech-processing system 200 for use in contextual entity resolution. In the illustrative embodiment, various types of context may be considered by components of NLU system 204. The context may include "live" entities for a voice-enabled device 102 such as foreground context 302, background context 304, and notifications context 306. Foreground context 302, in one embodiment, may correspond to content being rendered by display component 112. For example, lists of items (e.g., "To-Do" lists), detail pages (e.g., a single item view of a web page), video content (e.g., a movie playing on a voice-enabled device 102), and the like, may correspond to foreground context 302. Background context 304, in one embodiment, may correspond to content available for a voice-enabled device 102, but not necessarily being at a foreground of a voice-enabled device 102. For example, songs, audio books, or any other type of audio file, being output by speakers 210 may correspond to one exemplary type of background context. Notifications 306 may correspond to any type of notification capable of being provided to a voice-enabled device 102, but which may or may not constitute foreground or background context. For example, a notification indicating that a telephone call is incoming or has been missed, an email has been received, and the like, may correspond to various types of notification context.

Foreground context 302, background context 304, and notifications context 306 may each be employed to generate contextual data 308. Contextual data 308 may include, in some embodiments, context entity slots, list metadata, and/or any other suitable type of data (e.g., item specific identifiers). As an illustrative example, list metadata may indicate, amongst other entities, a list identifier entity—{List ID} indicating a domain relatable list identifier, a list position or absolute ordinal entity—{List Position}, and an item identifier—{Item ID}. List metadata may be used for list-related data for one or more contextual list items. Using this example, if a single object, such as a box of chocolates, is being displayed on display component 112, then {List ID} may have a value "<domain>_<custID>_<sessionID>," {List Position} may have a value "1", and {Item ID} may have a value "abcd1234." As another illustrative example, context entity slots may include {Item Name} having a value "Chocolate Item Name." The context entity slots may be used for specifying list-related attributes that may be searched when tied to declared slots from NLU system 204. Additional data, in an illustrative embodiment, may include {Item Identifier} having a value "XXXyyyZ1234." If the list currently being displayed by display component 112 included more than one item, for example, similar data for the second item may be included within contextual data 308, however the corresponding list position {List Position} may have a different value indicating that item's position within the list (e.g., a second list item may have a value "2" for its {List Position}). In this way, if an individual's utterance is directed a particular action to occur to a list item based on list position, the correct item may be identified (e.g., "Alexa, delete number two").

In some embodiments, songs/music playing in the background (e.g., background context 304) may also be included by contextual data 308. For example, the background context may include a unique identifier for the current audio file being played, such as a {Music Track Identifier} having a value "AAAbbbC6789." The background context may also include its own set of context entity slots such as, but not limited to, {Song Name} (e.g., "Song 1"), {Artist Name} (e.g., "Artist 1"), and {Album Name} (e.g., "Album 1"). In some embodiments, because the background context (e.g., background context 304) is not of a list form, list metadata may not be included.

Table 1 is an exemplary table including various example domains, their GUI list type, sample utterances that may be used when a corresponding GUI list is displayed, and an exemplary context entity slot that may be included.

TABLE 1

| Domain | GUI List Type | Sample Utterance | Context Entity Slot |
|---|---|---|---|
| ToDos | To-Do list | "Delete the first one" "Mark go running done" | {To Do Content}: "go running" |
| Shopping | Product Results | "Buy the first one" | {Item Name}: "Chocolate Bar Name" |
| Music | Songs | "Play the first one" | {Song Name}: "Song 1" {Artist Name}: "Artist 1" |

In some embodiments, Table 2 may correspond to an exemplary table for anaphora resolution including various example domains, their GUI list type, sample utterances that may be used when a corresponding GUI list is displayed, and an exemplary context entity slot that may be included. In one embodiment, list data entities, such as {List ID}, {Item ID}, and/or {List Position} may not be included unless the displayed list is a single item list.

TABLE 2

| Domain | GUI List Type | Sample Utterance | Context Entity Slot |
|---|---|---|---|
| Shopping | A purchasable product | "Buy this" "Add this to my shopping list" | {Item Name}: "Chocolate Bar Name" |
| Music | A playable song | "Play this" | {Song Name}: "Song 1" {Artist Name}: "Artist 1" |
| Video | A playable video | "Play this" | {Video Name}: "Video 1" |

In some embodiments, entities representing the displayed content, including text or other data corresponding to the slots/fields and their corresponding values, may be provided to NLU system 204. For example, context entity slots 310, list metadata 312, and optional additional data 314, and their corresponding values, may be provided to NLU system 204 for intent resolution. As an illustrative example, context entity slots 310 may include an item name of an item displayed by display component 112. In this way, if an individual says, "Buy this," the data corresponding to the item name of the item displayed by display component 112 may be provided to NLU system 204.

Contextual data 308, in one embodiment, may be provided to speech-processing system 200, and in particular to orchestrator 210. As opposed to requesting the contextual data from applications system 206, as illustrated above with reference to FIG. 3A, orchestrator 210 may cause contextual data 308 to be provided NLU system 204. In some embodiments, orchestrator 210 may also provide text data representing received audio data to NLU system 204. The output data from NLU system 204, which may include one or more resolved entities and a selected context file, may then be provided to applications system 206 to cause, or to attempt to cause, one or more actions to occur. However, in some embodiments, contextual data 308 may be provided to NLU system 204, instead of being provided to orchestrator 210 and then NLU system 204.

Example Process for Multi-Modal NLU Processing

As described above, the speech-processing system 200 may use ASR processing to generate text data that represents an utterance, and NLU processing to determine an intent of the utterance. NLU processing may generate a list of intent hypotheses for the utterance, where each intent hypotheses has a confidence score associated with it indicating a likelihood that the particular intent hypothesis is the utterance's intent. The list of intent hypotheses may be ranked from most likely to represent the utterance's intent to least likely to represent the utterance's intent, where the ranking is based on the intent hypotheses' feature/confidence scores.

For multi-modal devices, however, this process may be enhanced by using additional features associated with the voice-enabled device 102, such as whether the voice-enabled device 102 includes a display screen and/or whether content is being displayed by a display screen associated with the voice-enabled device 102, to refine the ranking of the intent hypotheses. For instance, if there is content being displayed by the display component 112, the spoken utterance may be referring to that content. Therefore, NLU system 204 may advantageously be configured to consider the content being displayed on the display screen when generating hypotheses in order to generate a more relevant or more accurate list of hypotheses.

Figure 4:
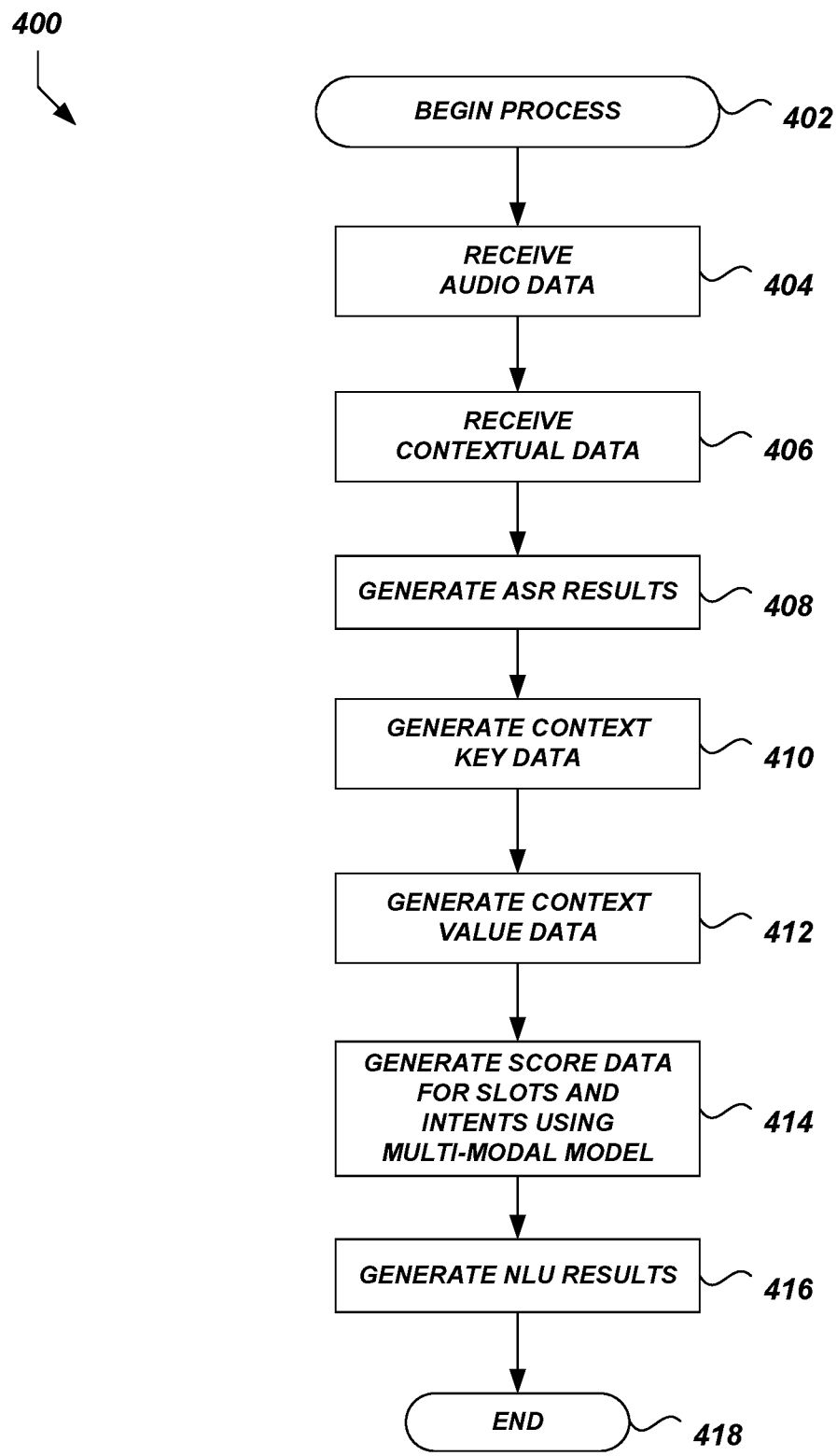
FIG. 4 is a flow diagram of an illustrative process for multi-modal processing of speech using contextual data according to some embodiments.

FIG. 4 illustrates an example process 400 for processing a user utterance using multi-modal data (e.g., audio data and contextual data regarding what is being displayed on a screen while the utterance is spoken). The process 400 may be performed by a speech processing system, such as the speech processing system 200 shown in FIGS. 1 and 2A. Portions of the process 400 will be described with reference to the illustrative NLU model 250 shown in FIGS. 5A and 5B.

The process begins at block 402. The process 400 may begin in response to an event, such as when the speech processing system 200 or some component thereof begins operation, or when the speech processing system 200 establishes a connection with a voice-enabled device 102. When the process 400 is initiated, a set of executable program instructions stored on one or more non-transitory computer-readable media (e.g., hard drive, flash memory, removable media, etc.) may be loaded into memory (e.g., random access memory or "RAM") of a computing device. In some embodiments, the process 400 or portions thereof may be implemented on multiple processors of a single computing device or multiple distinct computing devices, serially or in parallel.

At block 404, the speech processing system 200 may receive audio data from a voice-enabled device 102. For example, as shown in FIG. 1, a user 104 may make the utterance 106 "Play Harry Potter" while a listing of movies, including "Harry Potter" and "Interstellar" is displayed on the display component 112 of the voice-enabled device 102. The voice-enabled device 102 can transmit a signal of audio data representing the utterance to the speech processing system 200. In some embodiments, an orchestrator 210 may send, provide, or otherwise make available the audio data to an ASR system 202.

At block 406, the speech processing system 200 may receive or generate contextual data associated with the received audio data. The contextual data may be received from the voice-enabled device 102, from the application system 206, or from some other system or data store. For example, as described above with respect to FIG. 3A, the orchestrator 210 may initiate retrieval of contextual data from the applications system 206. In the present example, the video application may provide data regarding display of the listing of movies, including "Harry Potter" and "Interstellar," on the display component 112 of the voice-enabled device 102.

At block 408, the ASR system 202 can generate ASR results using the audio data received from the voice-enabled device 102. Illustratively, the ASR system 202 may generate ASR results using various models, such as an acoustic model and a language model. In some embodiments, the ASR results may be in the form of text data, such as a transcription, an N-best list of transcriptions, a vector of recognized words, or the like. The ASR results may then be provided to the NLU system 204. In some embodiments, the ASR system 202 may send, provide, or otherwise make available the ASR results to the NLU system 204 via the orchestrator 210.

At block 410, the NLU system 204 or some other system or component of the speech processing system 200 can begin generating model input data for use with a multi-modal model 250 in determining the intent of the user's utterance 106. The model input data may be generated or otherwise obtained in the form of context key data that represents the keys for each item of multi-modal context associated with the utterance. In some embodiments, there may be k different types of multi-modal context that may possibly associated with an utterance, (where k is a positive integer). For example, if the information provided on the display screen may be categorized into various domains such as videos, music, books, games, or general shopping, then there may be 5 different types of contextual data associated with an utterance. Each of the 5 different domains of contextual data may be assigned, identified by, or otherwise associated with a different context key representing a different domain. In order to provide the model 250 with data regarding the domain of context associated with an utterance, an input vector may be created or updated to include data regarding the context key(s) for the contextual data associated with the utterance.

In some embodiments, the context key data may be represented by a k-dimensional vector (where k is the number of possible keys, as described above). The vector may be referred to as a context key vector. Individual elements of the context key vector may be set to a value (e.g., 0 or false) if an item associated with the corresponding domain of multi-modal data is not associated with the utterance 106, or a different value (e.g., 1, true, or a count of the number of items of the corresponding domain of multi-modal data) if an item associated with the corresponding domain of multi-modal data is associated with the utterance. For example, if multi-modal data corresponding to a domain with a key of 1 is not present on the screen, then a value of 0 may be placed in the context key vector at the element with an index of 1, whereas if multi-modal data corresponding to a domain with a key of 2 is present, then a value of 1 may be placed in the context key vector at element 2. In some embodiments, a 1-hot vector may be used for the context key data. For example, only the first context key may be encoded with a value of 1, or the context key that appears in the most key-value pairs may be encoded with a value of 1.

At block 412, the NLU system 204 or some other system or component of the speech processing system 200 can generate additional model input data for use with the multi-modal model 250 in determining the intent of the user's utterance 106. The additional model input data may be context value data representing the values for each key-value pair that corresponds to an item of multi-modal context associated with the utterance. As described above, the multi-modal context associated with any particular utterance may be represented by a set of key-value pairs, where the key represents a domain that corresponds to the type of context (e.g., Onscreen_movie, Onscreen_music, etc.), and the value represents the item of contextual data (e.g., the particular movie or song name, etc.). Thus, the additional model input data may be generated or otherwise obtained in the form of a context value vector. The context value vector may be a multi-element data structure that stores data regarding the values assigned to individual items of contextual data displayed on the display component 112 during the utterance. In the present example, where the items displayed on the display component 112 may be represented by the list {(Onscreen_Movie, "harry potter"), (Onscreen_Movie, "interstellar")}, the context value vector may be created or updated to represent the values "harry potter" and "interstellar."

In some embodiments, the context value vector may be a fixed size vector. For example, given the limited screen size of a typical display, it can be assumed that a maximum of M items can appear simultaneously on the screen. Therefore, the context value vector may be an M-dimensional vector. Some elements in the context value vector may be empty, if there are less than M items in the screen. In some embodiments, the values of individual elements may be the words or values actually displayed, or some encoded value representative of the items on the screens. For example, the values may be set to fixed-length, pre-trained word embeddings for single-word items, or averages of the pre-trained word embeddings for multi-word items. Illustratively, the word "interstellar" is mapped to a pre-determined word embedding, and the value of the context value vector that corresponds to the movie "Interstellar" may be set to the pre-trained word embedding for "interstellar." The multi-word phrase "harry potter" may not be mapped to a pre-trained word embedding. However, the individual words "harry" and "potter" may be each be mapped to their own corresponding word embedding. The two different word embeddings can be combined into a single word embedding that has the same fixed length as the word embedding for "interstellar" (e.g., the two different word embeddings for "harry" and "potter" can be averaged). In some embodiments, the ordering of element values within the context value vector matches the order in which the corresponding items of contextual data appear on the display. For example, the top item in a list is encoded and saved in the first element of the context value vector, the second item in the list is encoded and saved in the second element, and so on). In some embodiments, the order of the values within the context value vector does not matter. For example, the encoded representation of "Harry Potter" may be placed in any of the M different elements of the context value, regardless of whether the listing for the movie "Harry Potter" displayed first, last, top, bottom, or at any particular location on the display.

At block 414, the NLU system 204 can generate scores for intents and content slots using the text data and other model input data generated or otherwise obtained above. The NLU system 204 can process the text data and other model input data using a multi-modal model, such as one of the models 250*a* or 250*b* (also referred to simply as "model 250" for convenience) shown in FIGS. 5A and 5B. The scores may indicate how likely individual labels are to be the correct labels for individual words of the utterance being processed. In the present example, the utterance "Play Harry Potter" includes three words: "Play," "Harry," and "Potter." The individual words may be labeled using a predetermined set of labels, including different labels for the various intents recognizable by the NLU system 204 and different labels for the content slots that correspond to the various intents.

Figure 5A:
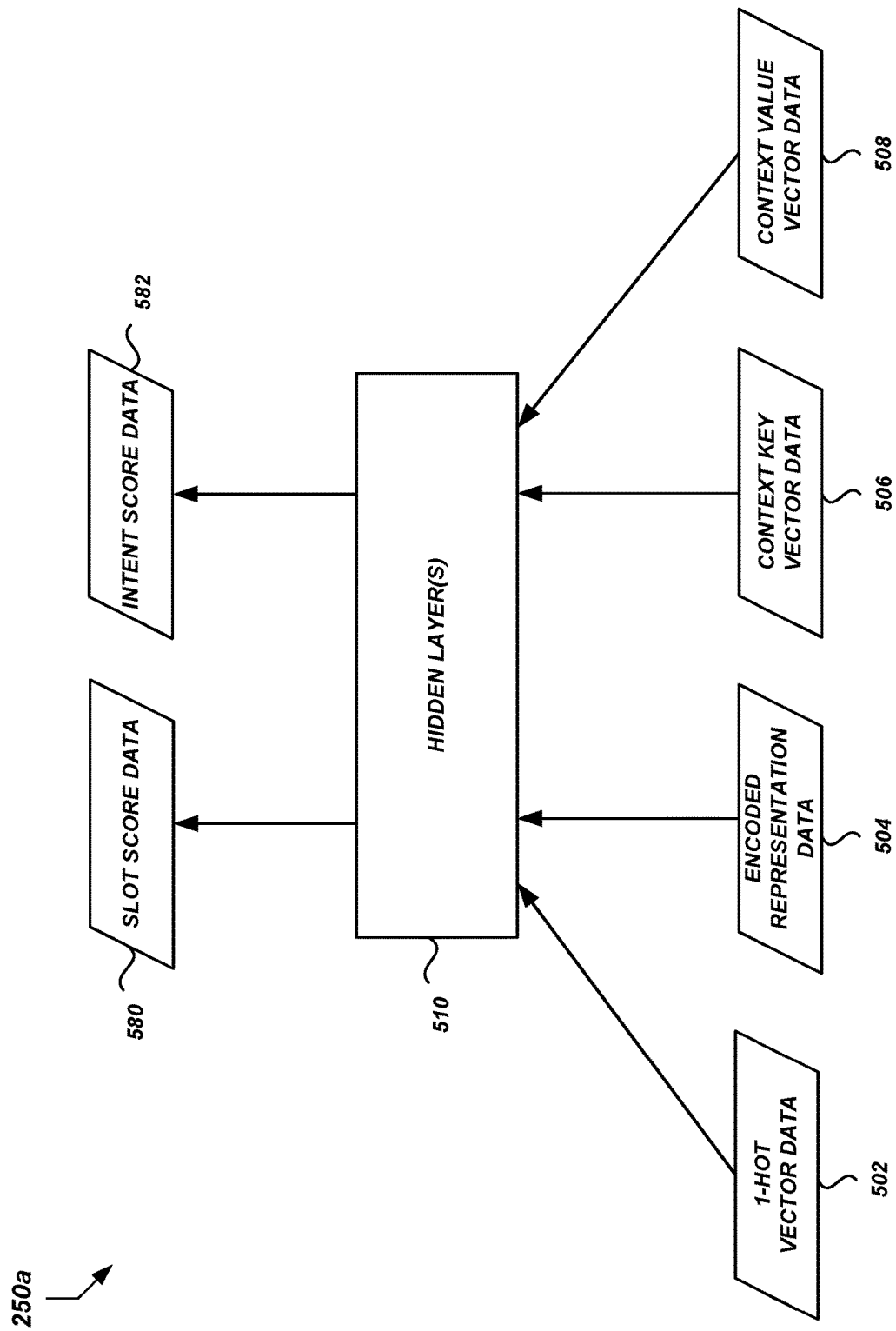
FIG. 5A is a diagram of an illustrative architecture for a model used for multi-modal processing of speech contextual data according to some embodiments.

In some embodiments, as shown in FIG. 5A, the model 250*a* may be a neural network, such as a deep neural network, a recurrent neural network, or some variant thereof. Such a model 250*a* may take multi-modal inputs representing text data (e.g., from the ASR system 202) and contextual data (as described above). The text data may be input into the model 250*a* using a data structure that represents each word of the text using vector data 502 representing a 1-hot vector and/or encode representation data 504 representing an encoded representation of the word. For example, vector data 502 may represent a vector that includes a total number of elements that corresponds to the total number of unique words recognizable by the ASR system 202 and/or able to be processed by the NLU system 204. For each word that is input into the model 250, the corresponding element of the 1-hot vector represented by vector data 502 may be set to a value (e.g., 1 or true), and each other element of the vector may be set to another value (e.g., 0 or false). Alternatively or in addition, encoded representation data 504 representing a fixed-length encoded representation of the word, such as a pre-trained word embedding, may be input into the model 250. The contextual data may be input using the data structures previously generated in the process 400, such as context key vector data 506 representing a context key vector, and context value vector data 508 representing a context value vector. The total set of input data that is input into the model 250*a* may include a separate set of vector data 502, encoded representation data 504, context key vector data 506, and context value vector data 508 for each word of the utterance being processed (or for each word generated by the ASR system 202). Thus, for an utterance having x words (where x is a positive integer), a matrix having x rows may be input into the model 250. Each row of the matrix may have different values for the vector data 502 and/or encoded representation data 504, depending upon the particular word to which the row corresponds. Each row of the matrix may have the same values for the context key vector data 506 and context value vector data 508 when the context is considered to be constant for an entire utterance. In some embodiments, the context key vector data 506 and context value vector data 508 may only be provided to the model 250 once, and the x row matrix may only include data for the vector data 502 and encoded representation data 504 for the words being processed.

As shown in FIG. 5A, the vector data 502, encoded representation data 504, context key vector data 506, and/or context value vector data 508 may be used as input into the model 250a to generate data representing one or more intermediate representations of the internal state of the model. An intermediate representation may also be referred to as a "hidden layer" representation, or simply as a hidden layer for convenience. A hidden layer 510 corresponds to an intermediate representation of the internal state of the model 250a between the "input layer" of the model 250 (e.g., vector data 502, encoded representation data 504, context key vector data 506, and context value vector 508) and the "output layer" of the model 250 (e.g., the slot score data 580 and the intent score data 582). Hidden layer data representing a hidden layer 510 may be generated by computing the output of an activation function (e.g., sigmoid) using parameter data representing a set of parameters of the model 250a, and values of the vector data 502, encoded representation data 504, context key vector data 506, and context value vector data 508. For example, the parameters of the model 250a may include weights. A first portion of the parameter data may represent the values of weights for generating hidden layer data representing a hidden layer 510. The values of the vector data 502 may be multiplied by the weights to calculate a set of products. The same process may be applied to values in the encoded representation data 504, context key vector data 506, and context value vector data 508. Once products have been calculated using weights and the values of the inputs, the activation function may be used to calculate a value for a single dimension of the hidden layer 510. This process may be repeated using different weights, different activation functions, or some combination thereof for each dimension of the hidden layer 510. Thus, if the hidden layer 510 corresponds to a 100-dimensional intermediate representation of model state, then 100 different outputs may be generated. The entire hidden layer computation process may be repeated for each additional hidden layer representation 510 (e.g., using a second portion of the parameter data), if the model 250a is configured to generate data for multiple hidden layers. The slot score data 580 and intent score data 582 may be generated from the last (or only) hidden layer 510 using a similar process by which individual values of the hidden layer 510 are multiplied by additional weights, and the resulting products are used to compute an output value for each of the slot score data 580 and intent score data 582.

Figure 5B:
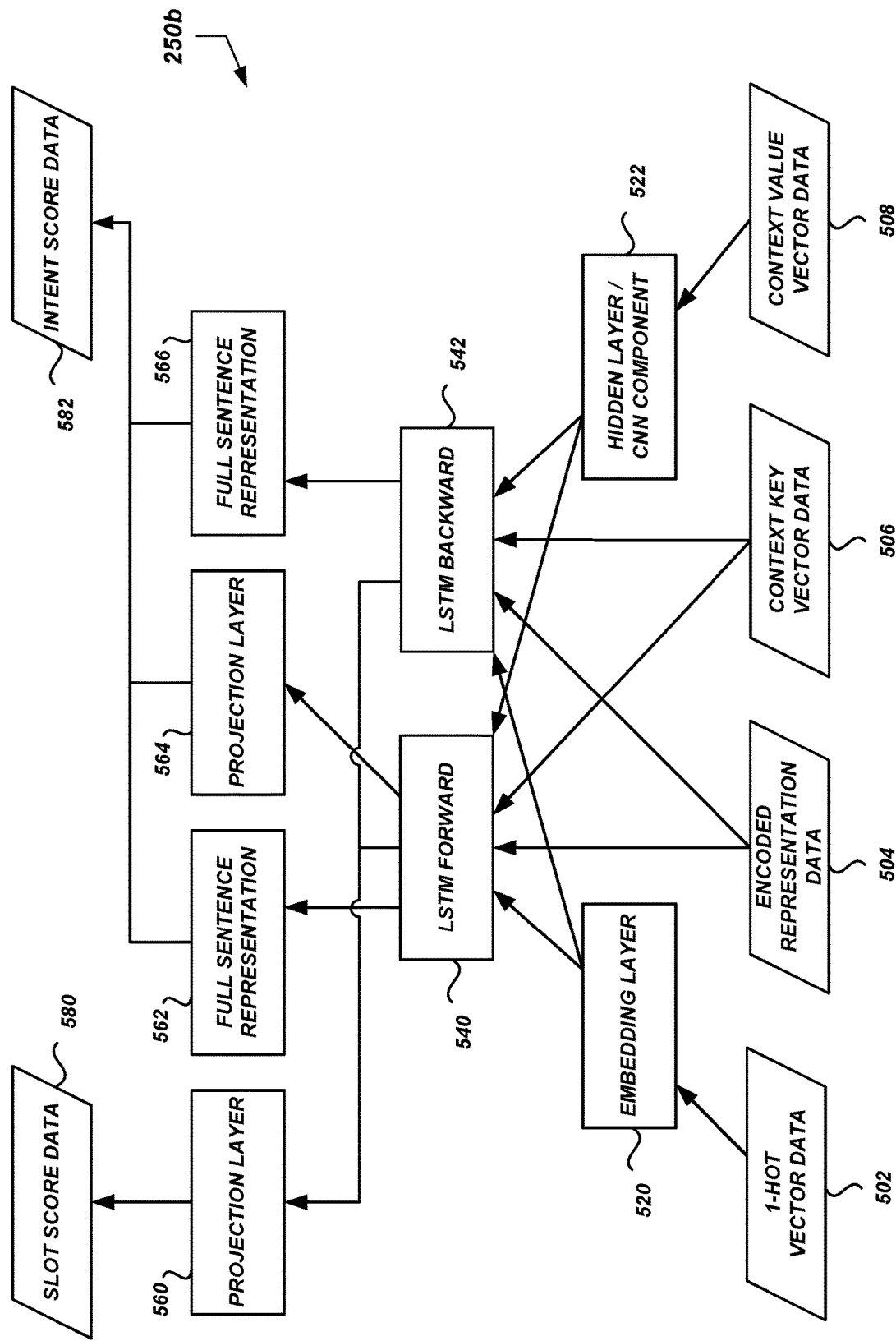
FIG. 5B is a diagram of an illustrative architecture for another model used for multi-modal processing of speech contextual data according to some embodiments.

In some embodiments, as shown in FIG. 5B, the model 250b may be a particular form of neural network, known as a Long Short Term Memory ("LSTM") neural network. The LSTM structure is designed to handle long-term dependencies between data inputs through the use of LSTM units that use memory cells to store data about previous time steps (e.g., previous sets of input data, corresponding to individual words as represented by the individual rows of an input matrix). Thus, the data from time step t may be used when processing the input data at time step t+1, t+2, and so on (e.g., data from processing the first word in an utterance may be used when processing the input data for subsequent words in the utterance).

In some embodiments, the LSTM unit used in the model 250b may operate through the use of an input gate i, an output gate o, a forget gate f, a memory cell c, and a hidden state output h. The LSTM unit may be defined using equations [1]-[5] below:

$$i_t = \text{sigmoid}(W_{i,x}x_t + W_{i,c}c_{t-1} + b_i) \quad [1]$$

$$o_t = \text{sigmoid}(W_{o,x}x_t + W_{o,c}c_{t-1} + b_o) \quad [2]$$

$$f_t = \text{sigmoid}(W_{f,x}x_t + W_{f,c}c_{t-1} + b_f) \quad [3]$$

$$c_t = f_t \circ c_{t-1} + i_t \tan h(W_{c,x}x + b_c) \quad [4]$$

$$h_t = o_t \circ \tan h(c_t) \quad [5]$$

where t is the time step, $x_t$ is the word at time step t, W is the weight for the corresponding subscripts, b is a bias factor for the corresponding subscript, and o is the Hadamard (element-wise) product.

In some embodiments, the model 250b may be a particular form of LSTM neural network, known as a Bidirectional LSTM ("Bi-LSTM"). The Bi-LSTM structure is "bidirectional" because it uses two LSTM units: a "forward" LSTM trained using words of an utterance in their normal sequential order, and a "backward" LSTM trained using words of the same utterance in reverse order.

As shown in FIG. 5B, vector 502 may be used to generate an embedding layer representation 520. The embedding layer representation data 520 may correspond to a learned representation of an individual word. The vector data 502, which represents a 1-hot vector indicating the current word being processed by the model 250b, is used to determine the embedding layer representation data 520 of the word. Context value vector data 508 may be used to generate hidden layer data representing a hidden layer 522. The hidden layer 522 may be generated by computing the output of an activation function (e.g., sigmoid) using a set of weights, a bias factor, and values of the context value vector data 508. For example, individual values of the context value vector data 508 may be multiplied by a corresponding weight to generate a product, a bias factor may be added to the product to generate a sum, and activation function output may be computed using the sum. The embedding layer representation data 520, the hidden layer data representing the hidden layer 522, the encoded representation data 504, and the context key vector 506 may be used to generate a forward LSTM representation 540 and a backward LSTM representation 542 (e.g., using equations [1]-[5] above).

For generating the scores for slot tagging, the forward LSTM representation 540 and backward LSTM representation 542 may be concatenated at each time step t (e.g., at each word) before passing the concatenated representation to a projection layer 560 that expands the LSTM representations 540 and 542 into the comparatively higher-dimension space of the slot score data 580. For example, the LSTM representations 540 and 542 may have about 100-200 dimensions, while the slot score data 580 may have 500-1000 dimensions or more, depending upon the number of slots that the system is configured and trained to fill. A softmax function may also be used to generate the various slot tagging scores.

For generating the scores for intent classification, a full sentence representation 562 may be obtained from final time step of the forward LSTM unit 540, and another full sentence representation 566 may be obtained from the initial times step of the backward LSTM unit 542. The two full sentence representations 562 and 566 may be concatenated with a set of LSTM forward representations 540 for the full sentence obtained from projection layer 564, and the concatenated full sentence representation may be passed to a softmax function to generate the intent classification scores.

In some embodiments, as shown in FIG. 5B, the model 250b may include a Convolutional Neural Network ("CNN") component 522 to process the context value vector data 508 instead of generating a hidden layer representation as discussed above. The CNN component 522 may include a convolutional layer and a max-pooling layer. Using the CNN component 522 can reduce the total number of parameters in the model 250b in comparison with using a hidden layer representation. This reduction is based on the relevance of the values in the context value vector 508: in a typical implementation, at most one of the values in the context value vector 508 (e.g., the individual items displayed on the screen) is relevant, assuming there are no duplicates. Thus, there may be no need to train weights for each of the possible screen locations to generate the hidden layer representation. Instead, the CNN component 522 can scan the values of the context value vector 508 using filters having shared weights, and select the value with the maximum relevance to the tasks of intent classification and slot tagging. In addition, the filters can be 1-dimensional because the items displayed on screen are unrelated and in random order, and therefore only one value is scanned at a time. Thus, the CNN component 522 may apply one or more convolutional filters that scan each value of the context value vector 508 consecutively. The CNN component 522 may then apply a max-pooling operation to select the most relevant value. The output of the CNN component 522 may be used to compute the LSTM representations 540 and 542, as described in greater detail above.

In some embodiments, a multi-modal model 250 may not use the context value vector 508 at all, and therefore may not generate a hidden layer or CNN component 522. Rather, the multi-modal model 250 may use only context key vector 506 and data regarding the textual representation of the utterance (e.g., the vectors 502 and/or encoded representations 504). In some embodiments, separate multi-modal models 250 may be used for intent classification and slot tagging. The example models 250 shown in FIGS. 5A and 5B are illustrative only, and are not intended to be limiting. In some embodiments, a different type of multi-modal model may be used, such as a CRF-based model, a maximum-entry-based model, etc. For example, a CRF-based model may be used in which text data and contextual data is processed into an intermediate representation of the state of the CRF-based model, and slot score data and/or intent score data may be generated from that intermediate representation.

In some embodiments, a multi-model model 250 may be trained by generating or otherwise obtaining a corpus of training data representing utterances made during display of content and utterances made without display of content. Randomized training data may be generated using a subset (e.g., one or more) of the utterances made during display of content by randomizing the order of the particular items displayed during the utterance. Additional randomized training data may be generated using a second subset of the utterances made during display of content and/or a third subset of the utterances made without display of content. In this case, the utterances can be randomly associated with data regarding items displayed during other utterances. This additional randomized training data can help the model 250 produce accurate output when displayed content is irrelevant to the meaning of the utterance. The multi-model model 250 may then be trained using some combination of the training data, with and/or without the associated contextual data.

At block 416, the NLU system 204 can generate NLU results using the scores generated above. In the present example, the NLU system 204 can determine that the utterance "Play 'Harry Potter'," which includes the word "play," may be associated with an intent in a video domain, a music domain, an audiobook domain, and a game domain. Each intent may have a score associated with it, where the score indicates a likelihood that the particular intent is the intent to which the utterance corresponds. Each intent may also be associated with one or more slots/fields/placeholders for parameters or related data to carry out the intent. In the present example, the NLU system 204 can determine that the words "Harry" and "Potter" may be associated with a "name" slot for various intents in the video domain, music domain, audiobook domain, and game domain. The "<play video>" intent may have the highest score, and may include a first slot of the "name" slot type. The words "Harry Potter" may be associated with the first slot, thereby producing the intent "<play video> <name='Harry Potter'>," which may be determined to be the final NLU result for the current utterance.

The NLU result may be provided to the orchestrator 210 or directly to the applications system 206, which can use the appropriate application (e.g., the video domain application) to respond to the utterance.

The process 400 may terminate at block 418.

Experimental Results

A system using the NLU models and processing described above has been tested against other systems. In one test, the systems included (1) a baseline system using a Bi-LSTM model that does not use contextual data, (2) a system using a Bi-LSTM model and rule-based contextual re-ranking of results, (3) a system using a Bi-LSTM model and contextual key data, (4) a system using a Bi-LSTM model with contextual key data and contextual value data, and (5) a system using a Bi-LSTM model with a CNN component, using contextual key data and contextual value data. There was an increase in overall performance (recall and precision) by all three contextual models in comparison with the baseline model and the model that was used with rule-based re-ranking. For contextual use cases (e.g., inputs for which there was multi-modal contextual data available, such as a display screen), there was a 26% improvement for intent recognition and a 4% improvement for slot recognition by the three contextual models in comparison with the other two models.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read data from, and write data to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   as performed by a computing system comprising one or more computer processors configured to execute specific instructions,
   receiving, from a computing device, audio data representing an utterance;
   generating text data using the audio data;
   receiving contextual data, wherein the contextual data represents content displayed by the computing device when the utterance occurred, and wherein the content is associated with domain data representing a first domain of a plurality of domains;
   generating input data for a natural language understanding ("NLU") model, wherein the input data comprises:
      first vector data representing at least a portion of the text data; and
      second vector data representing a context domain vector comprising a first element and a second element, wherein the first element corresponds to the first domain and the second element corresponds to a second domain of the plurality of domains, and wherein the second vector data indicates that content associated with the first domain was displayed when the utterance was made;
   generating data representing an internal state of the model using the first vector data, the second vector data, and first parameter data, wherein the first parameter data represents a first portion of parameters of the NLU model;
   generating intent score data using the data representing the internal state of the model and second parameter data representing a second portion of parameters of the NLU model, wherein the intent score data represents a confidence that the text data corresponds to intent data associated with the first domain; and sending the intent data to the first domain.

2. The computer-implemented method of claim 1, further comprising generating slot score data using the data representing the internal state of the NLU model and third parameter data representing a third portion of parameters of the NLU model, wherein the slot score data represents a confidence that the text data corresponds to a content slot associated with the intent data.

3. The computer-implemented method of claim 1, further comprising:

generating second intent score data using the data representing the internal state of the model and third parameter data representing a third portion of parameters of the NLU model, wherein the second intent score data represents a second confidence that the text data corresponds to second intent data associated with a second domain distinct from the first domain; and selecting the intent data based at least partly on an analysis of the intent score data with respect to the second intent score data.

4. The computer-implemented method of claim 1, further comprising:

prior to receiving the audio data, generating display data using the first domain, wherein the display data represents an item to be displayed by the computing device, and wherein the item is associated with the first domain; and sending the display data to the computing device.

5. The computer-implemented method of claim 1, wherein generating the second vector data comprises generating data representing a value of the first element indicating that content associated with the first domain was displayed when the utterance was made.

6. The computer-implemented method of claim 5, further comprising:

generating first hidden layer data using at least a portion of the text data and at least a portion of the first parameter data, wherein the NLU model comprises an artificial neural network;

generating long short term memory layer data using the first hidden layer data, the second vector data, and third parameter data representing values for a third portion of parameters of the NLU model; and generating the intent score data and entity score data using the long short term memory data and at least a portion of the second parameter data.

7. The computer-implemented method of claim 5, further comprising generating context content data comprising a fixed-length encoded representation of the item.

8. The computer-implemented method of claim 7, further comprising:

generating first hidden layer data using at least a portion of the text data and at least a portion of the first parameter data, wherein the NLU model comprises an artificial neural network;

generating second hidden layer data using at least a portion of the context content data and third parameter data representing values for a third portion of parameters of the NLU model;

generating long short term memory layer data using the first hidden layer data, the second hidden layer data, the second vector data, and fourth parameter data representing values for a fourth portion of parameters of the NLU model; and generating entity score data using the long short term memory data and at least a portion of the second parameter data.

9. The computer-implemented method of claim 8, wherein the generating the second hidden layer data comprises using a convolutional neural network layer of the NLU model.

10. The computer-implemented method of claim 1, wherein receiving the contextual data comprises receiving data representing at least one of: a background process of the computing device; an internal state of the computing device, or a capability of the computing device.

11. The computer-implemented method of claim 1, further comprising:

obtaining training data representing a first plurality of utterances made during display of content and second plurality of utterances made without display of content;

generating first randomized training data comprising data representing a first utterance of the first plurality of utterances and first randomized contextual data, wherein the first randomized contextual data is based at least partly on randomizing an order of individual items of content displayed during the first utterance;

generating second randomized training data comprising data representing a second utterance of the second plurality utterances and second randomized contextual data, wherein the second randomized contextual data is based at least partly on content displayed during a randomly-selected utterance of the first plurality of utterances and not displayed during the second utterance; and training the NLU model using the first randomized training data and the second randomized training data.

12. A system comprising:

computer-readable memory storing executable instructions; and one or more processors in communication with the computer-readable memory and configured by the executable instructions to at least:

receive, from a computing device, audio data representing an utterance;

generate text data using the audio data;

receive contextual data, wherein the contextual data represents content displayed by the computing device when the utterance occurred, and wherein the content is associated with domain data representing a first domain of a plurality of domains;

generate input data for a natural language understanding ("NLU") model, wherein the input data comprises:

first vector data representing at least a portion of the text data; and second vector data representing a context domain vector comprising a first element and a second element, wherein the first element corresponds to the first domain and the second element corresponds to a second domain of the plurality of domains, and wherein the second vector data indicates that content associated with the first domain was displayed when the utterance was made;

generate data representing an internal state of the model using the first vector data, the second vector data, and first parameter data, wherein the first parameter data represents a first portion of parameters of the NLU model;
generate intent score data using the data representing the internal state of the model and second parameter data representing a second portion of parameters of the NLU model, wherein the intent score data represents a confidence that the text data corresponds to intent data associated with the first domain; and
send the intent data to the first domain.

13. The system of claim 12, wherein the one or more processors are further configured by the executable instructions to generate slot score data using the data representing the internal state of the NLU model and third parameter data representing a third portion of parameters of the NLU model, wherein the slot score data represents a confidence that the text data corresponds to a content slot associated with the intent data.

14. The system of claim 12, one or more processors are further configured by the executable instructions to:
generate second intent score data using the data representing the internal state of the model and third parameter data representing a third portion of parameters of the NLU model, wherein the second intent score data represents a second confidence that the text data corresponds to second intent data associated with a second domain distinct from the first domain; and
select the intent data based at least partly on an analysis of the intent score data with respect to the second intent score data.

15. The system of claim 12, wherein data representing the first element comprises a value indicating that an item associated with the first domain was displayed when the utterance was made.

16. The system of claim 15, wherein the one or more processors are further configured by the executable instructions to generate context content data comprising a fixed-length encoded representation of the item.

17. The system of claim 16, wherein the one or more processors are further configured by the executable instructions to:
generate first hidden layer data using at least a portion of the text data and at least a portion of the first parameter data, wherein the NLU model comprises an artificial neural network;
generate second hidden layer data using at least a portion of the context content data and third parameter data representing values for a third portion of parameters of the NLU model;
generate long short term memory layer data using the first hidden layer data, the second hidden layer data, the second vector data, and fourth parameter data representing values for a fourth portion of parameters of the NLU model; and
generate entity score data using the long short term memory data and at least a portion of the second parameter data.

18. The system of claim 12, wherein the one or more processors are further configured by the executable instructions to receive second contextual data representing at least one of: a background process of the computing device; an internal state of the computing device, or a capability of the computing device.

19. The system of claim 12, wherein data representing the second element comprises a value indicating that the utterance did not occur during a display associated with the second domain.

20. The system of claim 12, wherein the one or more processors are further configured by the executable instructions to:
obtain training data representing a first plurality of utterances made during display of content and second plurality of utterances made without display of content;
generate first randomized training data comprising data representing a first utterance of the first plurality of utterances and first randomized contextual data, wherein the first randomized contextual data is based at least partly on randomizing an order of individual items of content displayed during the first utterance;
generate second randomized training data comprising data representing a second utterance of the second plurality utterances and second randomized contextual data, wherein the second randomized contextual data is based at least partly on content displayed during a randomly-selected utterance of the first plurality of utterances and not displayed during the second utterance; and
train the NLU model using the first randomized training data and the second randomized training data.

\* \* \* \* \*